United States Patent
Shimizu

(10) Patent No.: US 7,394,931 B2
(45) Date of Patent: Jul. 1, 2008

(54) IMAGE PROCESSING METHOD, PROGRAM, AND APPARATUS

(75) Inventor: Masayoshi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 293 days.

(21) Appl. No.: 11/398,614

(22) Filed: Apr. 6, 2006

(65) Prior Publication Data

US 2006/0176400 A1  Aug. 10, 2006

Related U.S. Application Data

(63) Continuation of application No. PCT/JP03/15891, filed on Dec. 11, 2003.

(51) Int. Cl.
*G06K 9/00* (2006.01)

(52) U.S. Cl. .......................... 382/168; 382/162

(58) Field of Classification Search ................ 382/168, 382/162, 181; 358/1.9, 2.1, 518, 520; 348/E9.04, 348/570, 162

See application file for complete search history.

(56) References Cited

U.S. PATENT DOCUMENTS 6,535,301 B1  3/2003  Kuwata et al. ............... 358/1.9

FOREIGN PATENT DOCUMENTS

| JP | 02-96477  | 4/1990  |
| JP | 06-133329 | 5/1994  |
| JP | 06-309433 | 11/1994 |
| JP | 08-079549 | 3/1996  |
| JP | 2001-92956 | 4/2001 |

*Primary Examiner*—Anh Hong Do
(74) *Attorney, Agent, or Firm*—Staas & Halsey LLP

(57) ABSTRACT

An image processing method according to this invention includes: generating a histogram by counting a number of pixels for each predetermined color section in a color system having no singular point, for a specific image; detecting a local peak that is a portion where the counted number of pixels is maximum in the generated histogram, and determining a local peak color value, which is a color value corresponding to said local peak; and identifying a pixel in the specific image based on the determined local peak color value. This enables the determination of an appropriate local peak color value regardless of the achromatic color or chromatic color.

27 Claims, 20 Drawing Sheets

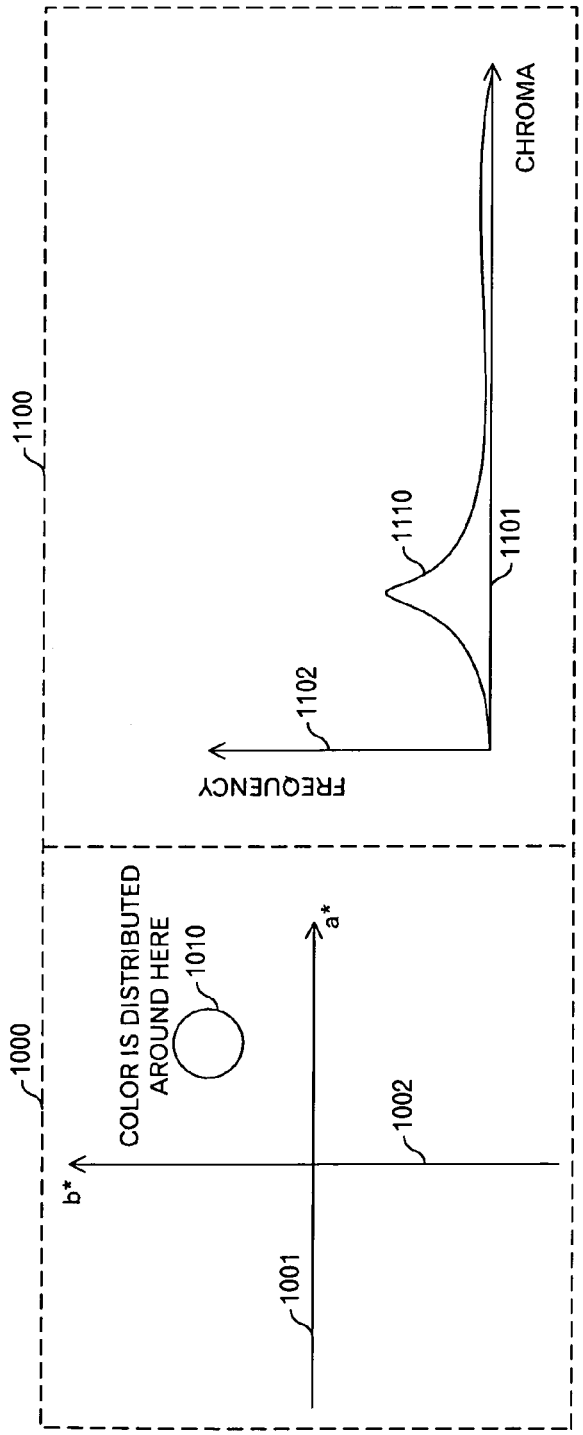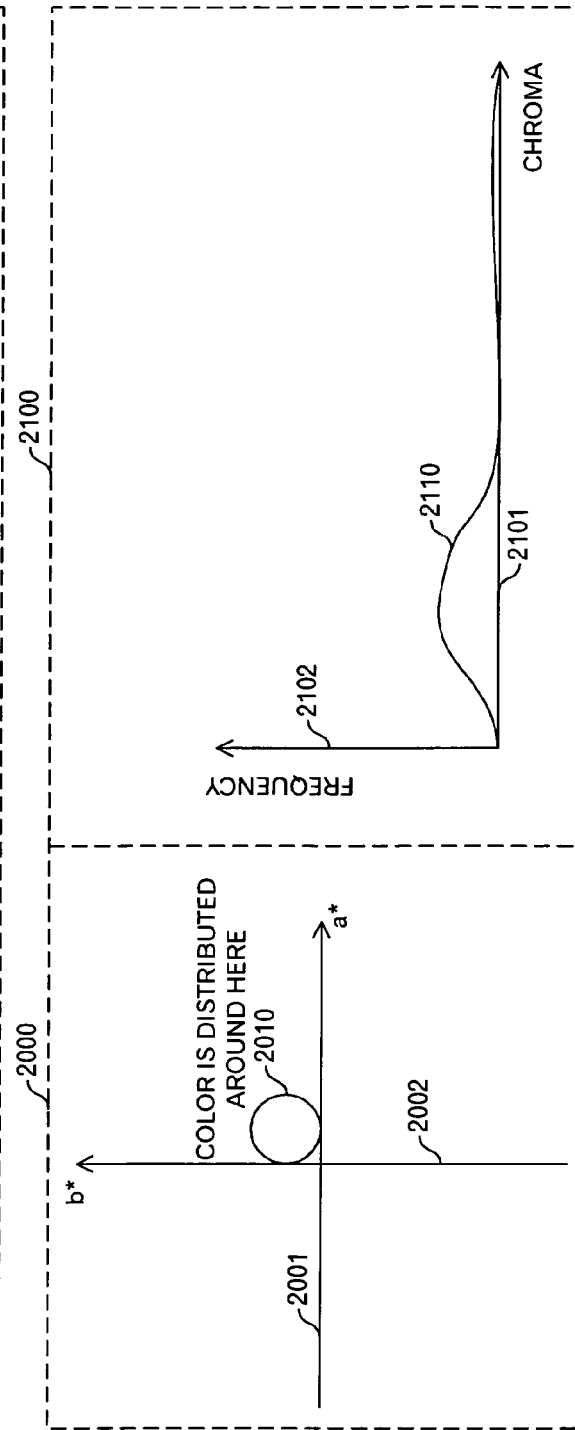

IMAGE PROCESSING METHOD, PROGRAM, AND APPARATUS

CROSS-REFERENCE TO RELATED APPLICATIONS

This application is a continuing application, filed under 35 U.S.C. section 111(a), of International Application PCT/JP2003/015891, filed Dec. 11, 2003.

TECHNICAL FIELD OF THE INVENTION

The present invention relates to an image processing technique.

BACKGROUND OF THE INVENTION

In recent years, there have been increased opportunities to use color images as digital data along with the popularization of image-related devices such as a digital camera and a color printer and due to enhanced performance of computers. A color image taken by a digital camera or the like, however, does not always provide a satisfactory image quality to users. For example, in some cases, skin tone is too reddish or the color of sky blue is dull. Therefore, there is a demand for a technique to improve image quality to an image that is satisfactory to users.

For example, JP-A-2001-92956 (Patent document 1) discloses a technique to carry out favorable color correction automatically for colors (human skin color, sky blue color, plant green color, and so on) of an important object in a natural image taken in various light environments. More specifically, it includes: representative color extraction means for reading out an distributable area of the hue of an object selected by object selection means and a distribution frequency in a divided hue region from an object color information memory and extracting a representative color; color correction parameter determination means for determining a color correction parameter optimal for the representative color extracted by the representative color extraction means from stored contents of a color correction parameter storage memory; and color correction means for correcting colors only for representative colors of the object and colors in the vicinity thereof in the input image.

In addition, for example, U.S. Pat. No. 6,535,301 (Patent document 2) discloses a technology to carry out appropriate color correction automatically with considering human memory colors (human skin color, sky blue color, plant green color, and so on). More specifically, it includes: chromaticity determination means for determining chromaticity of each pixel of image data; target chromaticity pixel counting means for counting pixels whose chromaticities determined by the chromaticity determination means are within a predetermined range; color correction amount determination means for determining a color correction amount for eliminating a difference between a predetermined optimal value regarding the pixels whose chromaticities are within the predetermined range and the counting result, and then correcting the color correction amount according to the proportion of the counted pixels relative to the total number of pixels; and color correction means for carrying out color correction of the image data on the basis of the color correction amount.

According to the aforementioned techniques, however, there still remain problems. For example, the technique described in the Patent document 1 adopts a method of generating a histogram based on the hue. In this method, while a stable processing can be expected when detecting an object whose chroma is high to some extent, there is a possibility that an appropriate processing may not be carried out when an object whose chroma is low. For example, in a people photograph, a face slightly palely photographed has a color with a low chroma. The color with a low chroma significantly changes in hue due to a slight color change such as the influence of noise or the influence of an illumination light color. More specifically, the technique has a problem that, when the chroma of an object is low, a distinct peak does not readily appear on the histogram.

FIG. 22A and FIG. 22B show conceptual diagrams for a peak detection, when generating a histogram based on the hue. FIG. 22A shows a color space diagram 1000 and a histogram 1100. The color space diagram 1000 shows an a* axis 1001 and a b* axis 1002 corresponding to a* and b*, respectively, which are color components of, for example, the CIELAB color system, and a distribution range 1010, which is a color distribution range of, for example, a peak (in other words, which contains a large number of pixels) color. In addition, the histogram 1100 has a hue axis 1101, a frequency axis 1102, and a frequency curve 1110.

Here, the color corresponding to the intersection of the a* axis 1001 and the b* axis 1002 is achromatic. Then, the distribution range 1010 is located in a position apart from the intersection of the a* axis 1001 and the b* axis 1002, which indicates that the chroma of the color is relatively high. In this case, the frequency curve 1110 of the histogram 1100 based on the hue has a sharp peak.

FIG. 22B shows a color space diagram 2000 and a histogram 2100. Similarly to the color space diagram 1000, the color space diagram 2000 shows an a* axis 2001 and a b* axis 2002 corresponding to a* and b*, respectively, which are color components of, for example, the CIELAB color system, and a distribution range 2010, which is a distribution range of, for example, a peak color. In addition, similarly to the histogram 1100, the histogram 2100 has a hue axis 2101, a frequency axis 2102, and a frequency curve 2110.

Here, the distribution range 2010 is located in a position close to the intersection of the a* axis 2001 and the b* axis 2002, which indicates that the chroma of the color is relatively low. In this case, the frequency curve 2110 of the histogram 2100 based on the hue does not have a sharp peak, whereby it is hard to detect the peak.

In this manner, when using the histogram based on the hue, the peak shape changes due to the chroma of the image and thereby there is a possibility that an object cannot be detected appropriately.

Moreover, for example, in the technique described in the Patent document 2, the strength of the correction is controlled according to the proportion of the counted pixels. Depending on the image, however, the strength of correction cannot be successfully controlled. For example, whether pixels considered to be of a skin color are scattered or concentrated on one place in the image does not affect the strength of correction. Actually, when there is a skin-color area (for example, a face), which is large to some extent, in the image, a strong correction should be applied to the skin color as a substantial part of the image. In the technique described in the Patent document 2, however, that kind of correction is not carried out. In addition, for the same color, the strength of the correction is uniformly controlled independently of the shape of the area or a degree of the color change. For example, even if it is the skin color area, however, the degree of user's attention varies greatly according to whether or not the area corresponds to a face. Therefore, in the technique described in the Patent document 2, an appropriate correction processing may not be carried out in some cases.

SUMMARY OF THE INVENTION

Therefore, an object of the present invention is to provide a new technique for appropriately identifying characteristic pixels of a specific image.

Another object of the present invention is to provide a new technique for appropriately correcting an image.

An image processing method according to the present invention includes: a step of generating a histogram by counting the number of pixels for each predetermined color section in a color system having no singular point, for a specific image; a peak color value determination step of detecting a local peak that is a portion where the counted number of pixels is maximum in the generated histogram and determining a local peak color value (at least one value of color components), which is a color value corresponding to the local peak; and a pixel identifying step of identifying a pixel in the specific image based on the determined local peak color value.

By adopting the color system having no singular point as described above, the local peak can be stably detected, independently of whether or not the color is achromatic or chromatic. For example, the histogram is generated according to the color system having a singular point in the technique described in the Patent document 1 and thereby the peak is unclear in the vicinity of the singular point. In the present invention, however, the peak can be easily detected without a particular arrangement. Incidentally, the singular point represents the discontinuity like the origin of polar coordinates, and is, for example, an achromatic color, when the color is represented by the hue and chroma.

Incidentally, as the local peak color value, the color value contained in the local peak (for example, a color value contained in the color section corresponding to the local peak, though it is not limited to a single color value) may be used, or the color value calculated in a predetermined method may be used. In addition, the pixel identifying step is executed, for example, as a step of identifying a pixel having the local peak color value or a step of identifying a pixel having a color value in a predetermined range from the local peak color value. The identified pixel is used as a pixel to be corrected in some cases and in other cases it is used as a material for a predetermined processing (for example, a processing for determining a likelihood that the pixel constitutes a face).

Moreover, the aforementioned color system having no singular point may be a uniform color system. Thereby, when the color sections are defined in such a way that the widths of colors to be covered are uniform, the color sections only need to have a uniform size. Therefore, the histogram generation is simplified.

Furthermore, the predetermined color section may be defined by color components other than the luminance among the color components constituting the color system having no singular point. The luminance component is susceptible to things other than an object such as, for example, a shadow, and therefore it is not preferable to use it for identifying pixels of the object, for example.

Moreover, in the peak color value determination step, a color value corresponding to the local peak may be calculated by using the number of pixels in the color section of the local peak and the number of pixels of the color sections in the vicinity of the color section of the local peak. Although, as described above, the color value contained in the local peak can be used directly for the local peak color value, it is also possible to obtain it according to a weighted mean method or other method by using the frequency of the pixels contained in the local peak and the frequency of pixels in the vicinity of the local peak. This enables the local peak color value to be calculated with higher resolution than the width of the color section.

Moreover, in the pixel identifying step, pixels having an adjacent color value of the local peak color value may be identified. Thereby, the pixels having the adjacent color value of the local peak color value can be extracted, for example, as pixels to be corrected, as described above. In addition, a predetermined processing may be carried out on the basis of the pixels having such an adjacent color value, for example, to identify pixels to be corrected.

Moreover, in the pixel identifying step, it may be determined whether or not a pixel in the specific image has the adjacent color value of the local peak color value by using thresholds, as references, which are different each other for each predetermined color component for determination of the adjacent color. When the histogram is generated for two or more color components, it is also effective to use thresholds, which are different each other for each color component, in order to select pixels having the adjacent color values. For example, it becomes possible to set a wider range that is considered as an adjacent area for a color component susceptible to things other than the object.

Moreover, in the pixel identifying step, pixels having an adjacent color value that is a color value satisfying a predetermined condition in relation to the local peak color value may be identified for a color component in a color system different from the color system defining the predetermined color section. For example, even if a histogram is generated by using a uniform color system, an appropriate pixel identification processing is achieved by identifying pixels having the adjacent color value using a color component in another color system which is not easy to be influenced from shadow or the like.

Moreover, the color component in the color system different from the color system defining the predetermined color section may be at least one of the chroma component and the hue component.

Moreover, the image processing method may further include the steps of: calculating a feature value of the pixel identified in the pixel identifying step for each local peak; and calculating an evaluation value corresponding to the local peak from the calculated feature value for each local peak. This enables the calculation of the evaluation value as a probability that, for example, a pixel group having the color corresponding to the local peak constitutes a predetermined object. For example, the probability that the pixel group having the color corresponding to the local peak constitutes a human face is calculated as the evaluation value.

Moreover, the feature value may be at least one of a value concerning the color values of the pixels identified in the pixel identifying step, a value concerning the variation of the color values of the identified pixels. For example, when the area corresponding to the human face in the image is to be processed, the face can be identified from the color values or the variation thereof to some extent. Therefore, the value concerning the color values or the variation of the color values is used as a feature value.

Moreover, the image processing method may further include: an area extraction step of extracting an area containing the pixel identified in the pixel identifying step; a step of calculating a feature value of the pixel contained in the extracted area for each extracted area; and a step of calculating an evaluation value corresponding to the area for each area from the calculated feature value. This enables the calculation of the evaluation value as a probability that the area corresponds to a specific object, for the area containing the pixel having, for example, the local peak color value. Incidentally, there is a case where the evaluation value is calculated for the area containing pixels having the adjacent color value of the local peak color value.

Moreover, the feature value may be at least one of a value concerning the color values of the pixels contained in the area, a value concerning the variation of the color values of the pixels contained in the area, the position of the area in the specific image, and the size of the area in the specific image. For example, when the area corresponding to the human face in the image is to be processed, it is possible to determine whether or not the area corresponds to the face, from the color value or the variation of the color values of the pixels contained in the area and the position or size of the area in the image. Therefore, the value concerning the color values, the variation of the color values, or the position or size of the area in the image is used as a feature value.

Moreover, in the area extraction step, the area may be extracted on the basis of positional continuity of pixels. Although the pixels having a predetermined color value may be scattered in the image in some cases, for example, a pixel group such as a human face is more likely to constitute a relatively large continuous area in the image. Therefore, an area having a higher probability of being the face can be extracted by calculating an evaluation value or the like for each area having positional continuity.

Moreover, the image processing method may further include a step of calculating a correction reference color value from the pixel identified in the pixel identifying step. While the local peak color value can be used as a correction reference color value directly, the correction reference color value is calculated from the pixel identified in the pixel identifying step again. For example, it is also possible to use an average of the color values of the pixels identified in the pixel identifying step, as the correction reference color value. In addition, when the pixels identified in the pixel identifying step have the adjacent color value of the local peak color value, the correction reference color value may be calculated, for example, by averaging, from the pixels.

Moreover, the image processing method may further include: an identifying step of identifying a pixel corresponding to the local peak to be a reference on the basis of the calculated evaluation value; and a step of calculating a correction reference color value from the identified pixel. For example, when a plurality of local peaks are detected, a correction reference color value is calculated on the basis of the pixels corresponding to the local peak that satisfies a predetermined condition such as a local peak having the largest evaluation value. This prevents a calculation of the correction reference color value, for example, based on another object having the same color. Therefore, an appropriate correction reference color value is more likely to be calculated.

Moreover, the image processing method may further include: a step of calculating a reference color correction amount (for example, an amount for each color component) on the basis of the calculated correction reference color value and a preset color value. For example, the preset color value is an ideal color value, and a correction amount, which causes the correction reference color value to be an ideal color value, is calculated as a reference color correction amount. Then, the pixel to be corrected is corrected on the basis of the reference color correction amount, thereby achieving an appropriate correction. Note that, however, the reference color correction amount may be adjusted due to other factors in some cases.

Moreover, the maximum value of the reference color correction amount may be adjusted on the basis of the aforementioned evaluation value. This enables setting for reducing the correction amount for pixels having a low probability of being a correction target, for example.

Moreover, the image processing method may further include: a step of correcting, only by the reference color correction amount, the pixels having the color values contained in the color range set on the basis of the distribution of the color values of the pixels identified in the identifying step. For example, the color range may be set on the basis of the standard deviation of the color values of the pixels identified in the identifying step. Incidentally, only the pixels identified in the identifying step may be corrected, or other pixels may be corrected only by the reference color correction amount or a correction amount changed from the reference color correction amount.

Moreover, the image processing method may further include: a correction amount changing step of changing the reference color correction amount according to a difference between the color value of a specific pixel contained in the specific image and the correction reference color value. This enables setting for reducing the correction amount for a pixel having a color value considerably different from the correction reference color value, for example.

Moreover, the correction amount changing step may be executed for each color component of the color system different from the color system having no singular point. For example, a difference between the color value of the specific pixel and the correction reference color value may be obtained on the basis of the chroma component and the hue component.

Moreover, a different change pattern of the reference color correction amount may be set for each color component of the color system different from the color system having no singular point. For example, even if pixels has the same color value, the different correction amount may be set for each color component or the different correction application range may be used for each color component.

Moreover, the color components of the color system different from the color system having no singular point may be the chroma component and the hue component. This enables setting of the chroma, which is unfavorable to change in comparison with the hue, in such a way as to be unchanged wherever possible.

Moreover, the image processing method may further include: a step of setting the change pattern of the reference color correction amount in the correction amount changing step, on the basis of a predetermined color value. This enables setting in such a way that the color unfavorable to change in color does not change wherever possible, for example.

Moreover, the predetermined color value may be of an achromatic color and the change pattern of the reference color correction amount may be set so as to reduce the correction amount of the achromatic color value. Since the correction that changes an achromatic color to a chromatic color is likely to be disliked by a user, the correction amount of the color value of the achromatic color is reduced and thereby an appropriate correction is achieved.

It is also possible to create a program for causing a computer to execute the method according to the present invention. The program is stored in a storage medium or a storage device such as a flexible disk, a CD-ROM, a magneto-optical disk, a semiconductor memory, a hard disk or the like. In addition, it may be distributed as digital signals over a network. Data under the processing is temporarily stored in a memory of the computer.

BRIEF DESCRIPTION OF THE DRAWINGS

FIG. 22A is a conceptual diagram (Part 1) of a peak detection; and

FIG. 22B is a conceptual diagram (Part 2) of the peak detection.

DETAILED DESCRIPTION OF THE PREFERRED EMBODIMENTS

Figure 1:
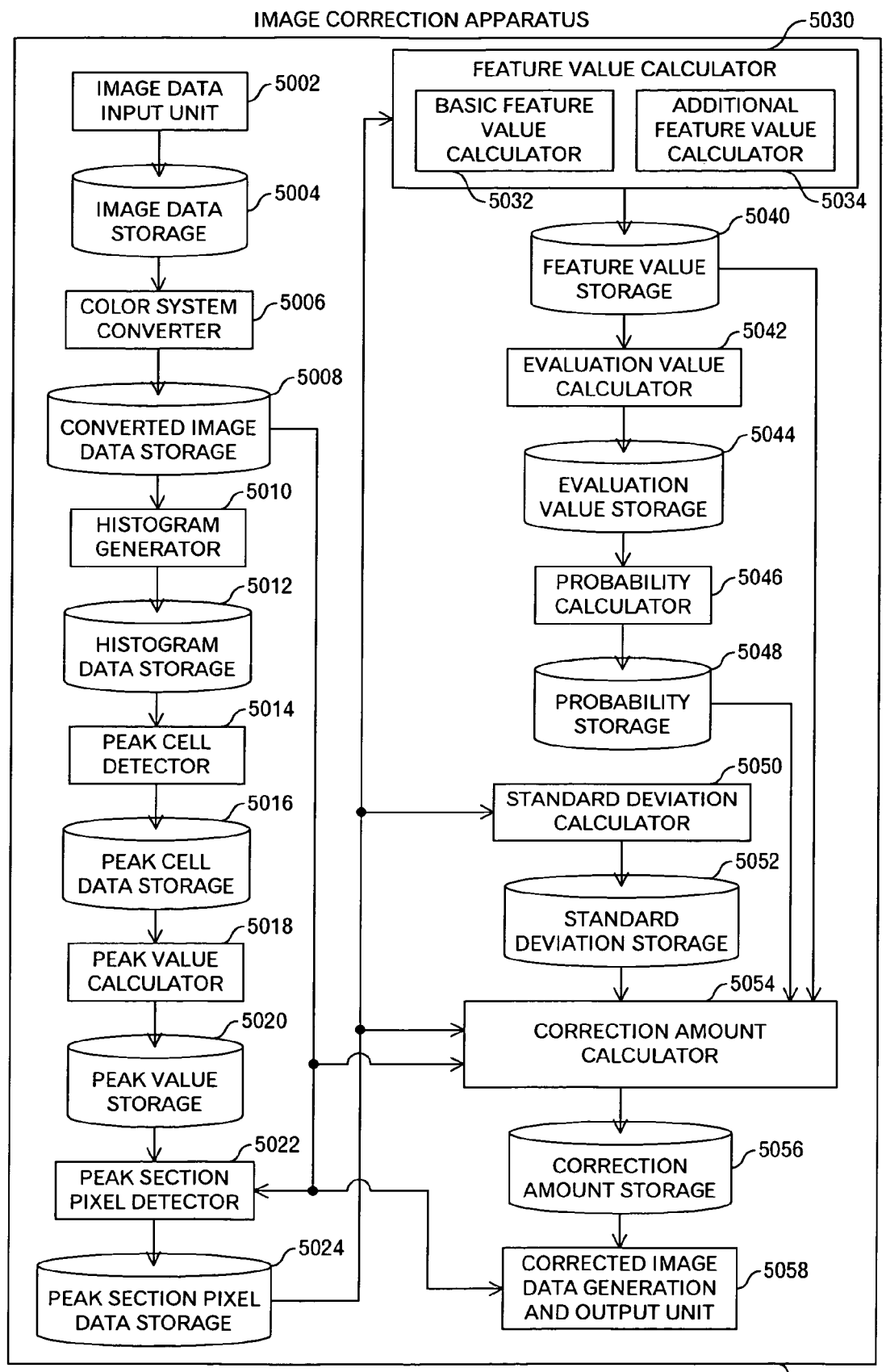
FIG. 1 is a functional block diagram of an image correction apparatus according to an embodiment of the present invention.

FIG. 1 shows a functional block diagram of an image correction apparatus according to one embodiment of the present invention. The image correction apparatus 5000 includes: an image data input unit 5002, an image data storage 5004, a color system converter 5006, a converted image data storage 5008, a histogram generator 5010, a histogram data storage 5012, a peak cell detector 5014, a peak cell data storage 5016, a peak value calculator 5018, a peak value storage 5020, a peak section pixel detector 5022, a peak section pixel data storage 5024, a feature value calculator 5030, a feature value storage 5040, an evaluation value calculator 5042, an evaluation value storage 5044, a probability calculator 5046, a probability storage 5048, a standard deviation calculator 5050, a standard deviation storage 5052, a correction amount calculator 5054, a correction amount storage 5056, and a corrected image data generation and output unit 5058. In addition, the feature value calculator 5030 includes a basic feature value calculator 5032 and an additional feature value calculator 5034.

Details of their processing contents will be described in the later explanation of processing flows. Here, the following briefly describes and focuses on the linkage relationship among the respective functional blocks.

The image data input unit 5002 is an interface with an external device such as a scanner or a digital camera, and the like. Upon reading or receiving image data, it stores the image data into the image data storage 5004. The color system converter 5006 reads the image data from the image data storage 5004, converts it into data in a predetermined color system, and stores the converted data into the converted image data storage 5008. The histogram generator 5010 reads the image data from the converted image data storage 5008, generates histogram data in the predetermined color system, and stores it into the histogram data storage 5012.

The peak cell detector 5014 detects a peak (in other words, which contains a large number of pixels) cell of the histogram by referring to the histogram data storage 5012 and stores data concerning the detected peak cell into the peak cell data storage 5016. The stored data may include data concerning cells in the vicinity of the peak cell in some cases. The peak value calculator 5018 determines a peak value according to a predetermined method by referring to the peak cell data storage 5016, and stores it into the peak value storage 5020.

The peak section pixel detector 5022 identifies pixels considered to be contained in the peak among the pixels constituting the image by referring to the converted image data storage 5008 and the peak value storage 5020, and stores data of the identified pixels into the peak section pixel data storage 5024. The basic feature value calculator 5032 and the additional feature value calculator 5034 of the feature value calculator 5030 calculate the feature values of the pixels belonging to the peak for each peak by referring to the peak section pixel data storage 5024, and store them into the feature value storage 5040.

The evaluation value calculator 5042 calculates evaluation values for each peak from the feature values of the pixels belonging to the peak by referring to the feature value storage 5040, and stores them into the evaluation value storage 5044. The probability calculator 5046 calculates a probability that an object corresponds to a predetermined object for each peak by referring to the evaluation value storage 5044, and stores the probability into the probability storage 5048. The standard deviation calculator 5050 calculates a standard deviation for a predetermined color component by referring to the peak section pixel data storage 5024, and stores the standard deviation into the standard deviation storage 5052.

The correction amount calculator 5054 calculates a correction amount for each pixel on the basis of a predetermined method by referring to the converted image data storage 5008, the peak section pixel data storage 5024, the feature value storage 5040, the probability storage 5048, and the standard deviation storage 5052, and stores the correction amount into the correction amount storage 5056. The corrected image data generation and output unit 5058 corrects image data read from the converted image data storage 5008 by referring to the correction amount storage 5056, and outputs the corrected image data to a printer, a display device, or the like, which is not shown. It may store the corrected image data into a predetermined storage device in some cases.

The processing contents of the image correction apparatus 5000 shown in FIG. 1 will be described hereinafter with reference to FIG. 2 to FIG. 21C. In this embodiment, for example, a processing for correcting a skin color of a human face will be described. The correction target may be, for example, sky blue, plant green, and the like.

Figure 2:
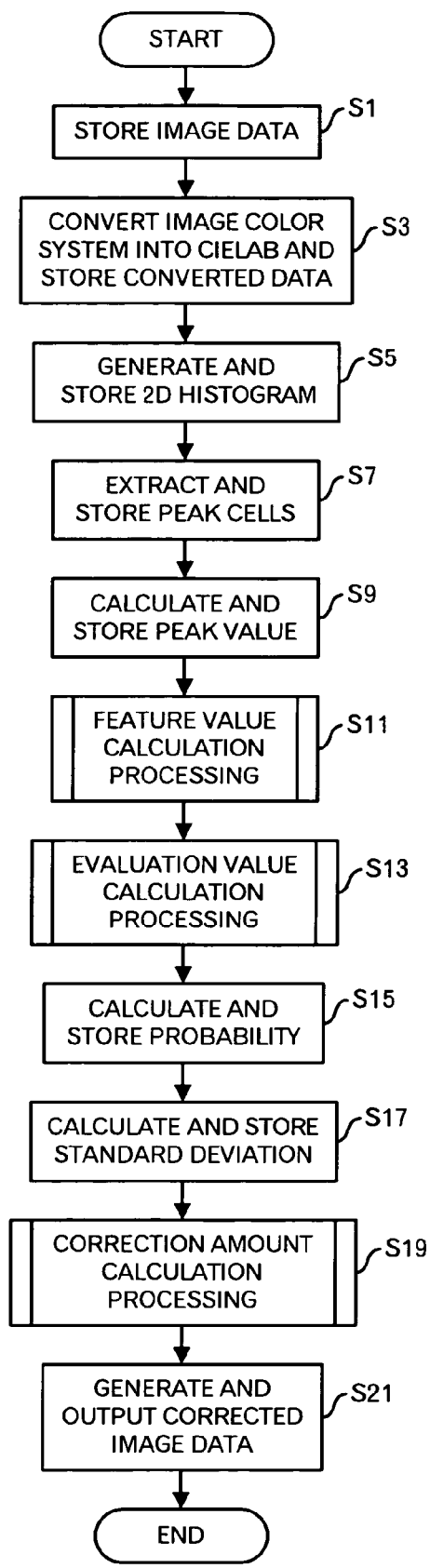
FIG. 2 is a diagram showing a main processing flow according to the embodiment of the present invention.

First, the image data input unit 5002, which is an interface with an external device such as a scanner or a digital camera, or the like, reads or receives image data including a human face as an object, and stores it into the image data storage 5004 (FIG. 2: step S1). Incidentally, the image data is assumed to be represented in the sRGB color system, for example.

Then, the color system converter 5006 reads the image data from the image data storage 5004, converts the sRGB color system to the CIELAB color system (L*: luminance, a*: red-green, b*: yellow-blue), and stores the image data after the conversion into the converted image data storage 5008 (step S3). Incidentally, the CIELAB color system is widely used in the fields of an image processing and a color processing, and has no singular point. For example, although the sRGB color system can be used directly, the CIELAB color system that is more uniform than the sRGB color system is used in this embodiment.

Incidentally because the conversion processing of the color system can be carried out by a general image processing program, its detailed description is omitted here. The color system before the conversion is not limited to the sRGB color system described above.

The histogram generator 5010 reads the image data from the converted image data storage 5008, generates histogram data for the a* component and the b* component in the CIELAB color system, and stores it into the histogram data storage 5012 (step S5). The L* component is used as a condition for selecting pixels to be processed. For example, pixels having extremely low luminance (in other words, dark) are unlikely to correspond to skin, and therefore they are excluded from the processing targets. For example, the pixels satisfying L*<30 are excluded.

Incidentally, the histogram data may also be generated while converting the color system of each pixel to a CIELAB value.

Figure 3:
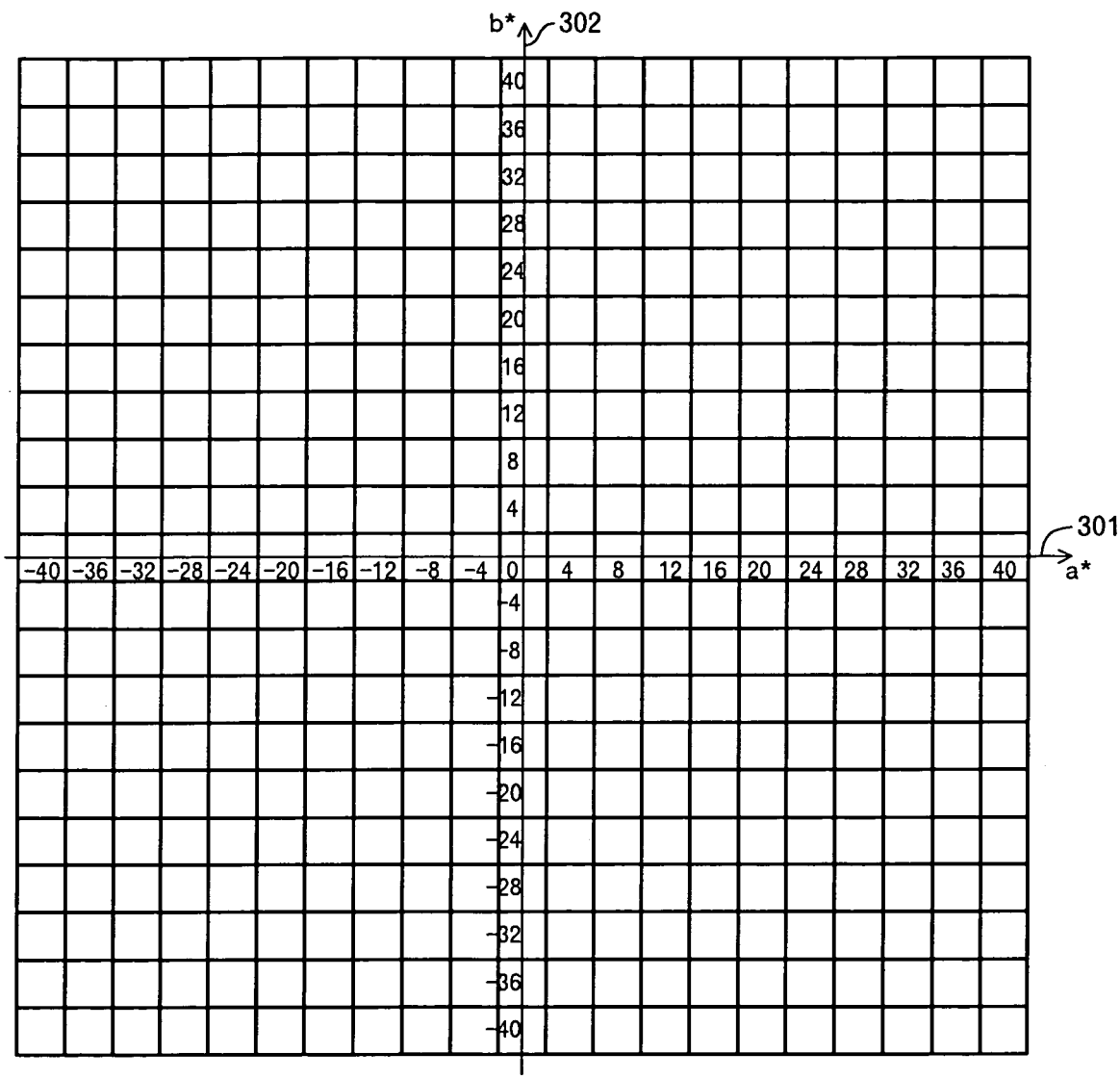
FIG. 3 is an example of a color space diagram used in a histogram generation.

FIG. 3 shows an example of a color space used in the histogram generation. In the example shown in FIG. 3, there is shown a color space extending with an a* axis 301 and a b* axis 302 corresponding to a* and b*, respectively, which are color components of the CIELAB color system. Then, the color space is divided in units of square cells each having a length 4 for each of the a* component and the b* component. The coordinate value of the center of each cell is associated with the cell as the value thereof. Incidentally, although the range of the a* component and that of the b* component are shown as a range of ±40 in FIG. 3, the shown ranges are only limited due to limitations of space, but actually it is assumed to be generated in a range of ±128, for example. Furthermore, the length of a side of the cell does not need to be 4.

In the histogram data generation, the number of pixels having the a* component and b* component values within the range of the cell is counted for each cell. Incidentally, a rule is determined in advance such that, for example, a boundary value belongs to a cell covering smaller color values among the cells on both sides.

Returning to the description of FIG. 2, the peak cell detector 5014 detects a peak (in other words, which contains a large number of pixels) cell, and stores data concerning the peak cell such as the color range, the number of pixels, and so on of the peak cell into the peak cell data storage 5016 (FIG. 2: step S7). In this embodiment, the peak is defined as a cell whose frequency is higher than or equal to the frequencies of the four adjacent (on the left, right, top, and bottom in FIG. 3) cells. Incidentally, there may be a plurality of peaks or a plurality of cells (peak cells) corresponding to one peak may exist in some cases. In addition, in this embodiment, data concerning the cells adjacent to the peak cell is also stored.

At this point, it is generally determined that the object having the color corresponding to the peak exists in the image. More specifically, the pixels having the color values corresponding to the peak cell can be considered as pixels constituting, for example, a human face. For example, when an average color of the pixels, which constitute the peaks, is within a predetermined skin color range, the color may be considered as a skin color in the image and corrected to a more desirable color to correct the skin color in the image.

Figure 4:
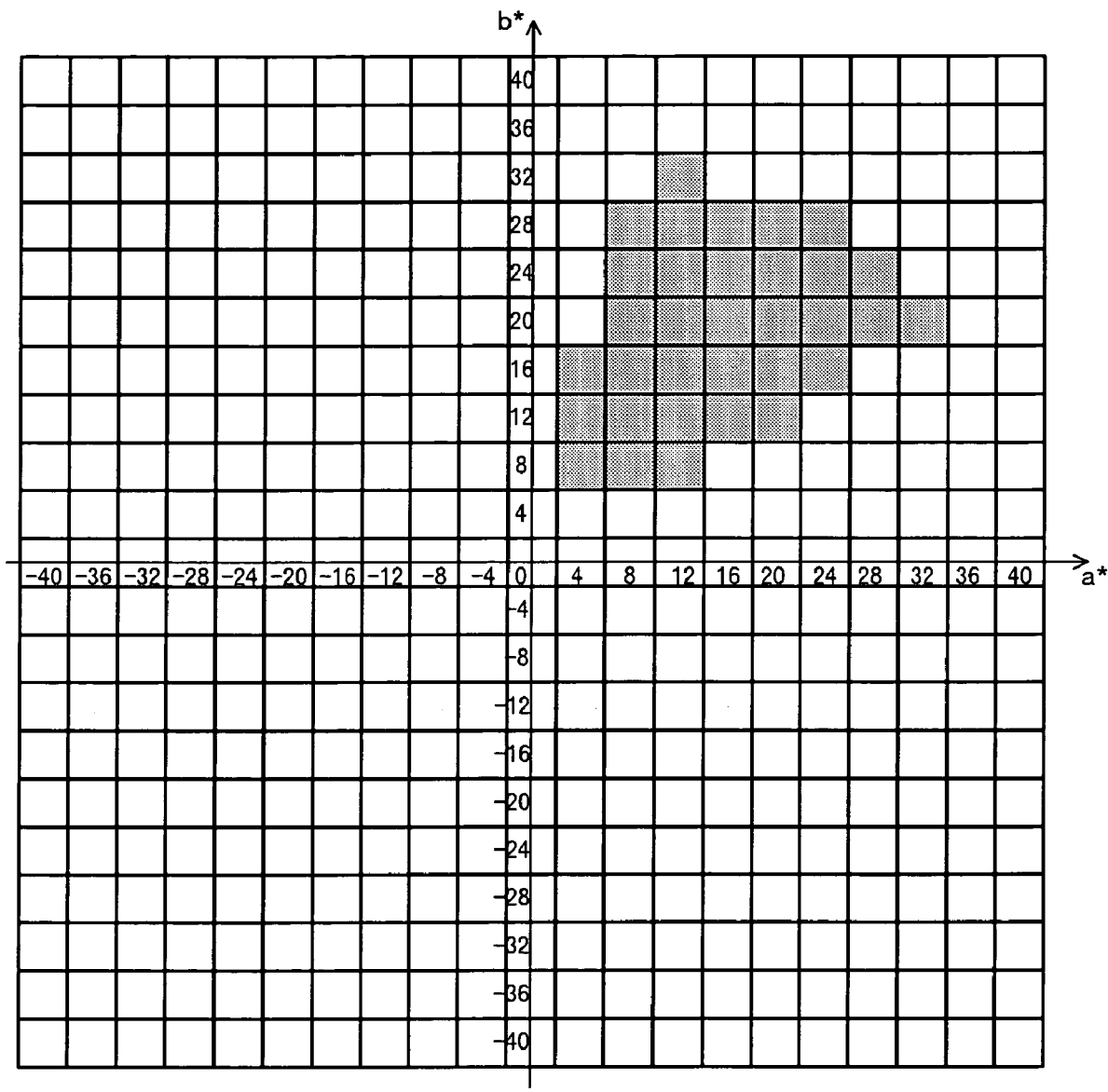
FIG. 4 is a diagram showing an example of an active area in a color space.

Incidentally, in the histogram data generation, an active area may be set for the color space to generate the histogram data only in the range. FIG. 4 shows an example of the active area in the color space. In FIG. 4, the cells are partially hatched in the same color space as the color space shown in FIG. 3. For example, the frequency may be counted only for the hatched cells. The hatched cells indicate a general range of the skin color. When the peak is detected in this range, the average color of the pixels constituting the peak may be considered as a skin color in the image and corrected to a more desirable color.

Returning to the description of FIG. 2, the peak value calculator 5018 calculates a peak value on the basis of the data stored in the peak cell data storage 5016, and stores it into the peak value storage 5020 (FIG. 2: step S9). For the calculation of the peak value, a quadratic function shown in the following expression (1) is used. Here, $a_{nm}$ indicates the value (for example, the center value of the cell) (hereinafter, simply referred to as a* value) of the a* component of a cell, which covers smaller color values, among the cells adjacent to the peak cell, $a_c$ indicates the a* value (for example, the center value of the cell) of the peak cell, and $a_{np}$ indicates the a* value (for example, the center value of the cell) of a cell, which covers greater color values, among the cells adjacent to the peak cell. $f_{nm}$ indicates the frequency of the cell, which covers smaller color values, among the cells adjacent to the peak cell, $f_c$ indicates the frequency of the peak cell, and $f_{np}$ indicates the frequency of a cell, which covers greater color values, among the cells adjacent to the peak cell. Then, the maximum value of the quadratic function (namely, a parabola) passing through three points $(a_{nm}, f_{nm})$, $(a_{peak}, f_{peak})$, and $(a_{np}, f_{np})$ is defined as a peak value. $a_{peak}$ indicates a peak value of the a* component.

$$a_{peak}=a_c+4((f_{nm}-f_{np})/(2(f_{nm}+f_{np}-2f_c))) \quad (1)$$

For example, $(a_{nm}, f_{nm})$, $(a_c, f_c)$, and $(a_{np}, f_{np})$ are (20, 783) (24, 1317), and (28, 144), $a_{peak}$ is found to be 23.25. Incidentally, when the processing speed is focused or in other cases, $a_c$ can be used directly as a peak value, too. Incidentally, the peak value may be an average or the like of the color values of the pixels constituting the peak cell. The aforementioned expression (1) is a calculation formula concerning the a* component and the peak value for the b* component is also calculated using the similar formula.

After the calculation of the peak value, the peak section pixel detector 5022 and the feature value calculator 5030 carry out a feature value calculation processing (step S11). While this processing will be described later in detail, the feature values are calculated for each peak and stored into the feature value storage 5040. In this embodiment, as basic feature values, the following values are calculated: Count (the total number of pixels corresponding to the peak), CountLoc (the number of pixels having the maximum luminance), Lmax (maximum luminance), Lmin (minimum luminance), Lavr (average of the L* values), aavr (average of a* values), and bavr (average of b* values). In addition, as additional feature values, the following values may be calculated: XYRatio (an aspect ratio of the area constituted by the pixels corresponding to the peak) and SQRatio (a pixel density of the area constituted by the pixels corresponding to the peak). Incidentally, the additional feature values differ from the basic feature values in attributes. The basic feature values are data to be a base for calculating an evaluation value described hereinafter, and the additional feature values are directly treated as a part of the evaluation value data.

Then, the evaluation value calculator 5042 calculates evaluation values for each peak on the basis of the aforementioned basic feature values, and stores them into the evaluation value storage 5044 (step S13). While the evaluation value calculation processing will also be described in detail later, the evaluation values (values of 0 to 1) are calculated, for example, for the following ten items: (1) the upper limit of luminance (Lavr), (2) the lower limit of luminance, (3) the upper limit of chroma (($aavr^2+bavr^2$)$^{1/2}$), (4) the lower limit of chroma, (5) the upper limit of hue (atan2 (bavr, aavr), 0 to 360 deg.), (6) the lower limit of hue, (7) the upper limit of luminance width (Lmax−Lmin), (8) the lower limit of luminance width, (9) the upper limit of luminance maximum incidence rate (CountLoc/Count), and (10) the lower limit of luminance maximum incidence rate.

Then, the probability calculator 5046 calculates a probability that the pixels corresponding to the peak constitute a human face (likelihood of a face) on the basis of the calculated evaluation values in the above, and stores it into the probability storage 5048 (step S15). In this embodiment, a geometric mean of the evaluation values of, for example, the ten items described above is calculated as the probability. Incidentally, in this embodiment, when there is a plurality of peaks, the correction amount calculation processing is carried out on the basis of the peak having the maximum probability. In addition, only the pixels corresponding to the peak having the maximum probability may be intended for the correction. Furthermore, when the additional feature values are calculated, there is a case where a plurality of areas is identified for one peak. In such a case, the probability is calculated for each area. Therefore, the correction may be carried out only for the area having the maximum probability. Furthermore, the correction amount calculation processing or the correction processing may be carried out for all the peaks whose probability is other than zero. Similarly, the correction amount calculation processing or the correction processing may be carried out for all the areas whose probability is other than zero. Furthermore, the correction amount calculation processing or the correction processing may be carried out for peaks or areas having a probability equal to or greater than a specific threshold.

Then, the standard deviation calculator 5050 calculates a standard deviation corresponding to a peak, for example, for a predetermined color component, and stores it into the standard deviation storage 5052 (step S17). In this embodiment, the standard deviation is calculated for the hue component, the chroma component, and the luminance component. More specifically, it decomposes a difference between the color value of the pixels corresponding to the peak and an average (aavr, bavr), in the a* component and the b* component, into the differences (vectors) in the Chroma component Dc and the hue component Dh, and calculates a standard deviation on the basis of their sum of squares. Incidentally, in order to decompose the difference in the a* component and the b* component into the differences in the chroma component Dc and the hue component Dh for each pixel, the expression (2) shown below is used, where a and b indicate the a* value and the b* value of the pixel to be processed, respectively.

$$Da = a - aavr, Db = b - bavr \qquad (2)$$
$$AbsAvr = (aavr^2 + bavr^2)^{\frac{1}{2}}$$
$$Ua = aavr / AbsAvr, Ub = bavr / AbsASvr$$
$$Dc = Da^*Ua + Db^*Ub, Dh = Da^*Ub - Db^*Ua$$

The standard deviation (STDc, STDh, STD1) is calculated on the basis of Dc and Dh calculated using the expression (2) and the difference from the average of the L* component.

Then, the correction amount calculator 5054 reads the image data from the converted image data storage 5008 and carries out a correction amount calculation processing for each pixel by using the feature values, the probability, and the standard deviation calculated hereinabove (step S19). While the correction amount calculation processing will be described in detail later, no correction may be set (the correction amount is zero in all color components) in some cases, depending on a pixel. The correction image data generation and output unit 5058 generates corrected image data by carrying out the correction processing on the basis of the correction amount calculated in the above and outputs it to a printer, a display device, or the like, which is not shown (step S21). The corrected image data may be stored in the storage device. As described hereinabove, the image correction processing is completed.

In this manner, the peak and the object are extracted independently of the chroma on the basis of the histogram data in the color system having no singular point. In addition, the image correction processing is carried out on the basis of the appropriately extracted peaks.

Figure 5:
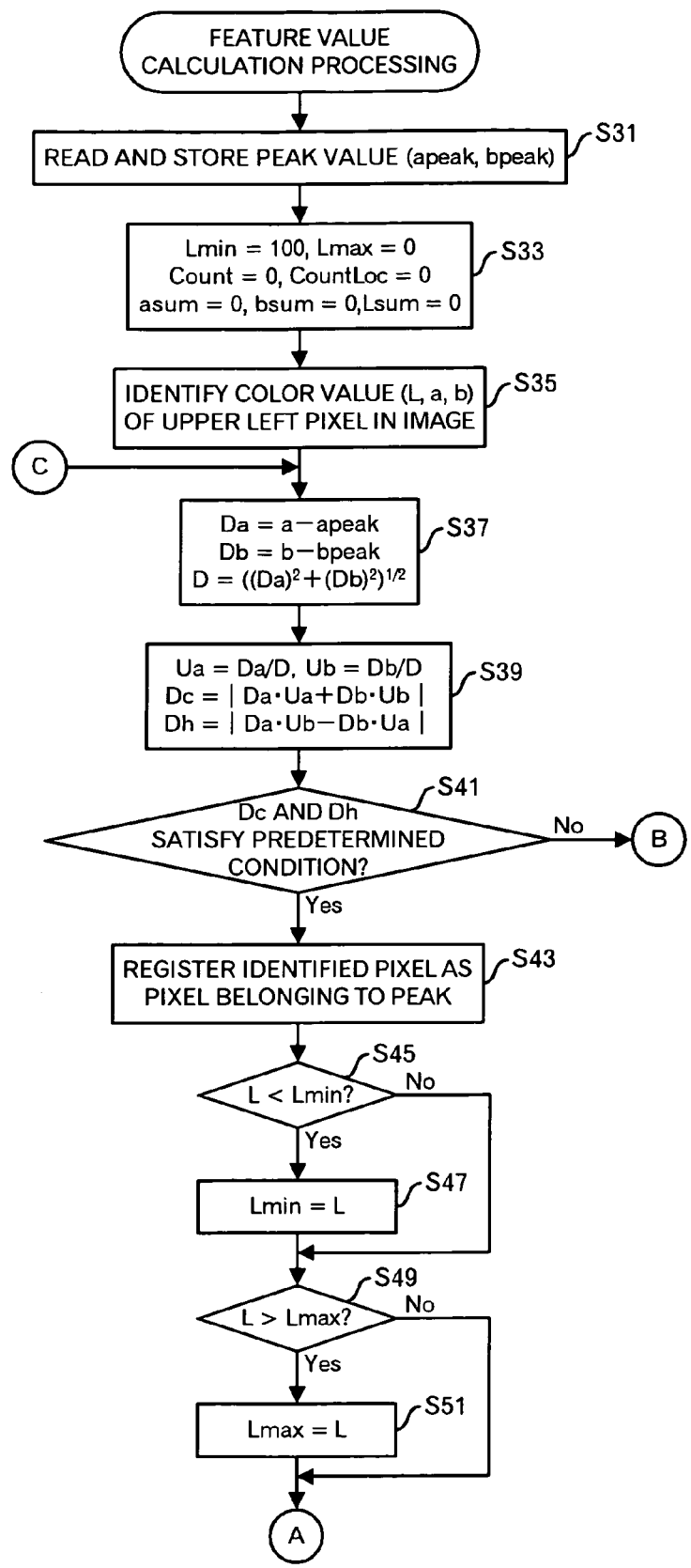
FIG. 5 is a diagram showing a processing flow (Part 1) of a feature value calculation processing.

Subsequently, the feature value calculation processing (FIG. 2: step S11) will be described in detail with reference to FIG. 5 to FIG. 7. The feature value calculation processing is carried out for each peak. First, the peak section pixel detector 5022 reads the peak values from the peak value storage 5020, and temporarily stores them into a storage device such as a work memory area (FIG. 5: step S31). The peak values include apeak (the peak value of the a* component) and bpeak (the peak value of the b* component).

Thereafter, the basic feature value calculator 5032 of the feature value calculator 5030 sets initial values of the basic feature values (step S33). For example, settings are made as follows: Lmin=100, Lmax=0, Count=0, CountLoc=0, asum (the sum of a* values)=0, bsum=(the sum of b* values)=0, and Lsum (the sum of L* values)=0. Thereafter, they are stored temporarily into the storage device such as a work memory area.

The peak section pixel detector 5022 then reads the image data from the converted image data storage 5008, and identifies a color value (L, a, b) of, for example, the upper left pixel in the image (step S35). L, a, and b indicate L* component, a* component, and b* component values, respectively. Then, the peak section pixel detector 5022 calculates a difference D between the color value (a, b) of the pixel and the peak value (apeak, bpeak) by using expressions (3) shown below, and stores it into the storage device such as a work memory area (step S37).

$$Da = a - apeak, Db = b - bpeak \quad (3)$$
$$D = ((Da)^2 + (Db)^2)^{\frac{1}{2}}$$

Furthermore, the peak section pixel detector 5022 decomposes the difference D between the color value of the pixel and the peak value into the chroma component Dc and the hue component Dh by using expressions (4) shown below, and stores the Dc and Dh values into the storage device such as a work memory area (step S39).

$$Ua = Da/D, Ub = Db/D \quad (4)$$
$$Dc = |Da^* Ua + Db^* Ub|, Dh = |Da^* Ub - Db^* Ua|$$

Figure 6:
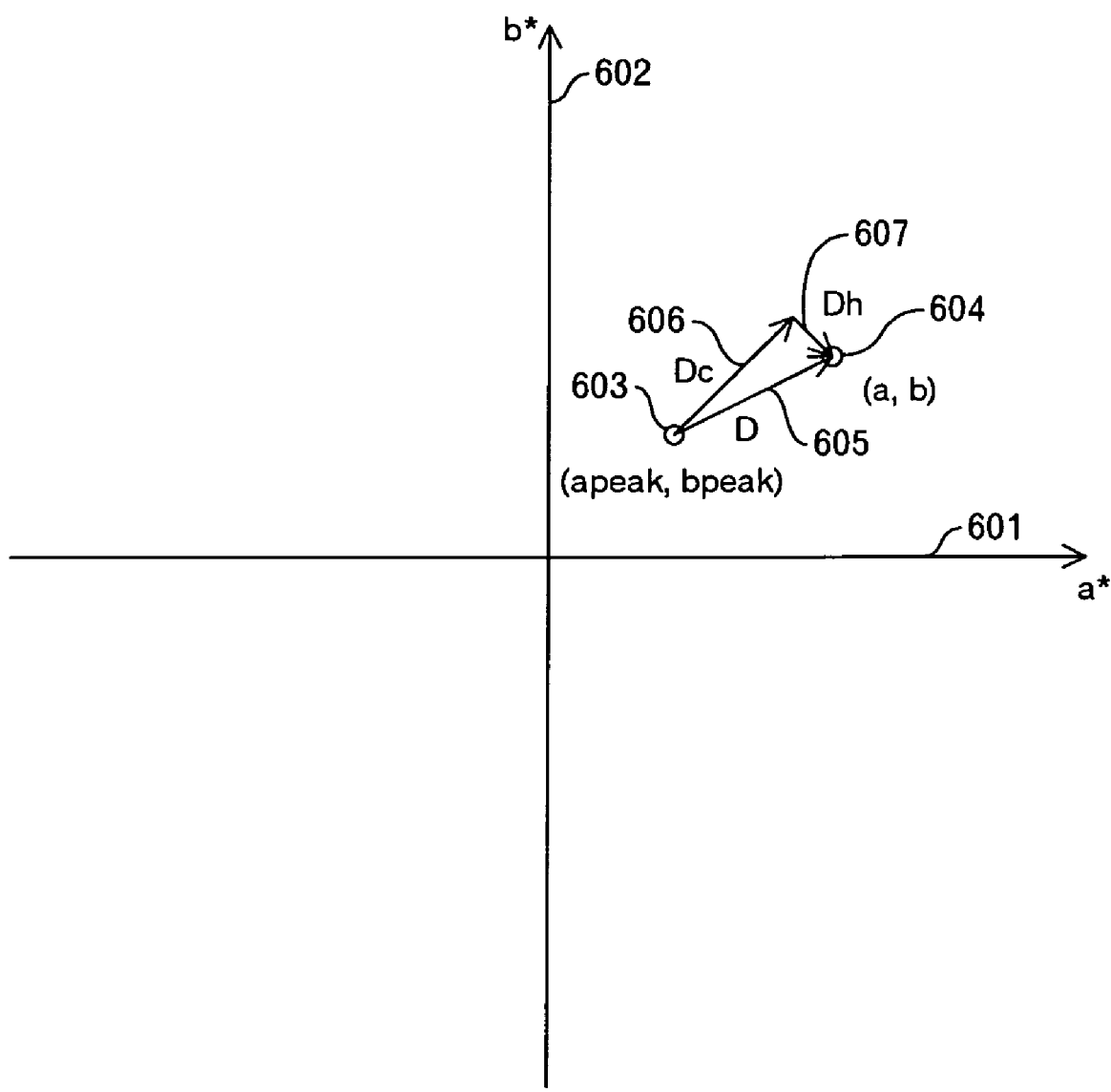
FIG. 6 is a conceptual diagram of component decomposition.

FIG. 6 shows a conceptual diagram of the component decomposition. In the example shown in FIG. 6, there is shown a color space extending with an a* axis 601 and a b* axis 602 corresponding to a* and b*, respectively, which are color components of the CIELAB color system. And, on the color space, there are shown a point 603 indicating a peak value (apeak, bpeak), a point 604 indicating a color value (a, b) of a specific pixel, a D vector 605, a Dc vector 606, and a Dh vector 607. The D vector 605 is a vector from the point 603 indicating the peak value to the point 604 indicating the color value of the specific pixel, and has a length calculated based on the aforementioned expression (3). The D vector 605 is decomposed into the chroma component and the hue component, that is, the Dc vector 606 (the chroma component) and the Dh vector 607 (the hue component) have a length calculated based on the aforementioned expression (4). The Dc vector 606 exists on a straight line passing through two points of the origin (the intersection between the a* axis 601 and the b* axis 602) and the point 603 indicating the peak value. The Dh vector 607 is orthogonal to the Dc vector 606.

Returning to the description of FIG. 5, the peak section pixel detector 5022 determines whether or not the Dc and Dh values calculated by the aforementioned expression (4) satisfy a predetermined condition (step S41). For example, different thresholds among the components (for example, THc (the threshold of the chroma component) and THh (the threshold of the hue component) satisfying THc>THh) are predefined. It is then determined whether the condition Dc<THc and Dh<THh is satisfied. For example, when there is a reference color value, which is the main color value of a certain object, a pixel having a color value whose hue differs from the reference color value by a predetermined amount is more likely to be a pixel contained in the object having the reference color value than a pixel having a color value whose chroma differs from the reference color value by the predetermined amount. Therefore, the aforementioned processing is carried out.

Moreover, for example, DIVc (namely, the threshold of the chroma component) and DIVh (namely, the threshold of the hue component) satisfying DIVc>DIVh and THch (namely, the general threshold) may be predefined, and it may be determined whether the condition THch<((Dc/DIVc)²+(Dh/DIVh)²) is satisfied.

When the condition is not judged to be satisfied (step S41: No route), the processing progresses to a processing shown in FIG. 7 via a terminal B. On the other hand, when the condition is judged to be satisfied (step S41: YES route), the peak section pixel detector 5022 stores the data of the pixel currently identified (in other words, processed in step S37 to step S41) as data of the pixels belonging to the peak into the peak section pixel data storage 5024 (step S43).

Thereafter, the basic feature value calculator 5032 of the feature value calculator 5030 judges whether or not L (the L* value of the identified pixel) is smaller than Lmin, in other words, L<Lmin (step S45). When L<Lmin is not judged to be satisfied (step S45: NO route), the processing progresses to the processing of step S49 described later. On the other hand, when L<Lmin is judged to be satisfied (step S45: YES route), the basic feature value calculator 5032 sets the L value to Lmin (step S47).

Moreover, the basic feature value calculator 5032 judges whether or not L is greater than Lmax, in other words, L>Lmax (step S49). When L>Lmax is not judged to be satisfied (step S49: NO route), the processing progresses to the processing shown in FIG. 7 via a terminal A. On the other hand, when L>Lmax is judged (step S49: YES route), the basic feature value calculator 5032 sets the L value to Lmax (step S51). The processing progresses to the processing shown in FIG. 7 via the terminal A.

Figure 7:
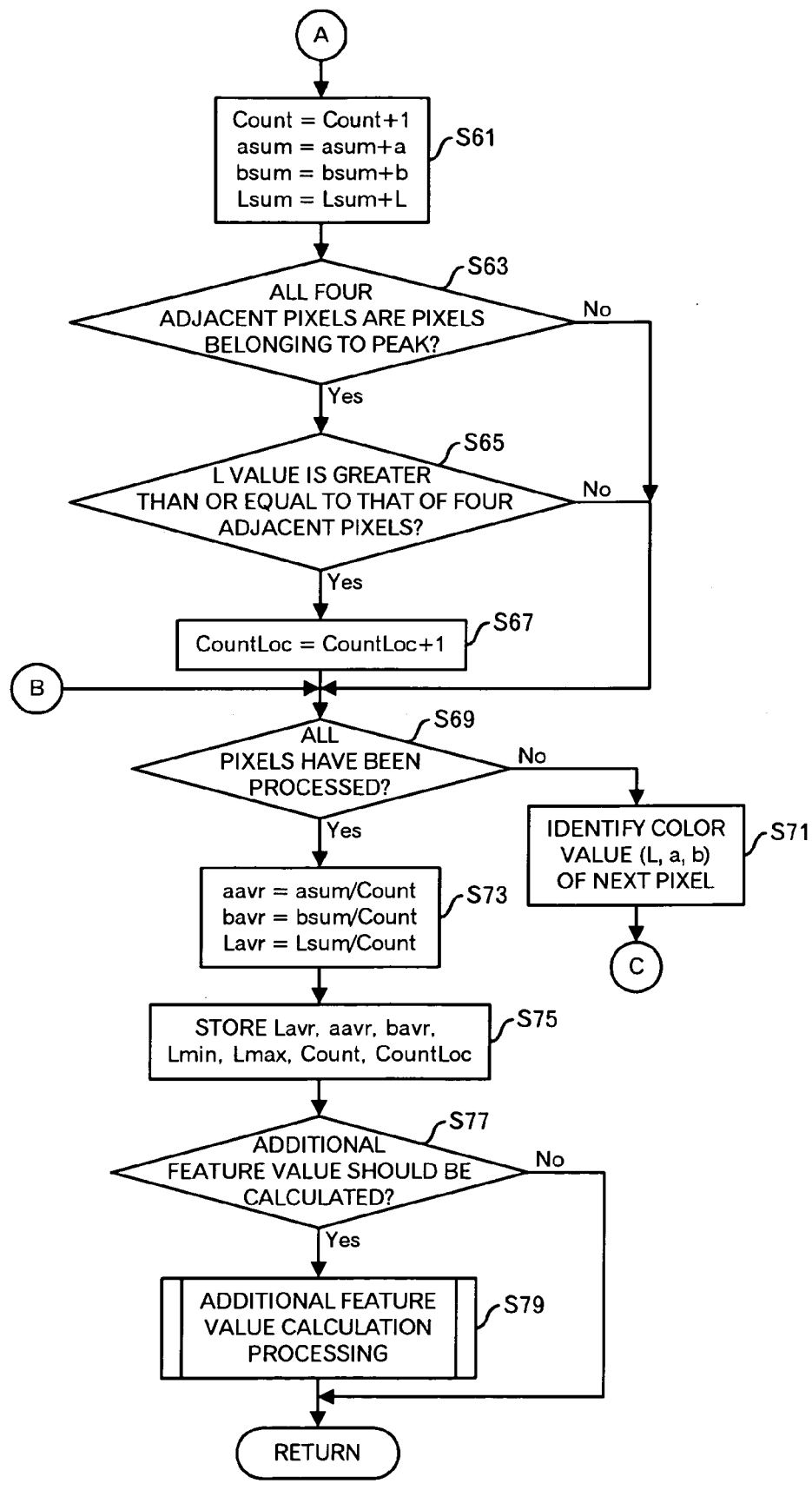
FIG. 7 is a diagram showing a processing flow (Part 2) of the feature value calculation processing.

Thereafter, the basic feature value calculator 5032 carries out cumulative additions of the number of pixels and the color values (FIG. 7: step S61). More specifically, the Count value is incremented by 1, and asum, bsum, and Lsum are set to asum+a (the a* value of the identified pixel), bsum+b (the b* value of the identified pixel), and Lsum+L (the L* value of the identified pixel), respectively.

Then, the basic feature value calculator 5032 judges whether or not all of the four pixels adjacent to the identified pixel (on the left, right, top, and bottom of the identified pixel in the image) are pixels belonging to the peak (step S63). Incidentally, the pixels to be checked are not limited to the four adjacent pixels, but can be, for example, eight adjacent pixels (pixels on the left, right, top, and bottom of and obliquely adjacent to the identified pixel in the image). When all of the four adjacent pixels are not judged to be pixels belonging to the peak (step S63: NO route), the processing progresses to a processing in step S69 described later. On the other hand, when all of the four adjacent pixels are judged to be pixels belonging to the peak (step S63: YES route), the basic feature value calculator 5032 judges whether or not the L* value of the identified pixel is greater than or equal to any other L* values of the four adjacent pixels (step S65). The pixels to be checked are not limited to the four adjacent pixels, but can be, for example, eight adjacent pixels.

When the L* value of the identified pixel is not judged to be greater than or equal to any other L* values of the four adjacent pixels (step S65: NO route), the processing progresses to the processing in step S69 described later. On the other hand, when the L* value of the identified pixel is judges to be greater than or equal to any other L* values of the four adjacent pixels (step S65: YES route), the basic feature value calculator 5032 increments the CountLoc value by 1 (step S67).

Thereafter, the basic feature value calculator 5032 judges whether or not the processing for all the pixels has been completed (step S69). When it is not judged that the processing of all the pixels has been completed (step S69: NO route), the peak section pixel detector 5022 identifies the color value (L, a, b) of the next pixel (step S71). For example, the right adjacent pixel is identified from the left top pixel in order.

After the right-end pixel is identified, the left-end pixel in the next line below is identified. Then, the processing returns to the processing of step S37 (FIG. 5) via a terminal C.

On the other hand, when it is judged that the processing for all the pixels has been completed (step S69: YES route), the basic feature value calculator 5032 calculates aavr (the average of the a* value), bavr (the average of the b* value), and Lavr (the average of the L* value) (step S73). They are calculated by using the following expression (5):

$$aavr = asum/Count, bavr = bsum/Count, \quad (5)$$
$$Lavr = Lsum/Count$$

The basic feature value calculator 5032 then stores Count (the total number of pixels corresponding to (contained in) the peak), CountLoc (the number of pixels whose luminance is maximum), Lmax (maximum luminance), Lmin (minimum luminance), Lavr (the average of the L* value), aavr (the average of the a* value), and bavr (the average of the b* value) as feature values into the feature value storage 5040 (step S75).

Thereafter, the additional feature value calculator 5034 judges whether or not the setting of calculating the additional feature values has been set in advance (step S77). When it is not judged that the setting of calculating the additional feature values has been set in advance (step S77: NO route), the feature value calculation processing is terminated and the processing returns to the original processing. On the other hand, when it is judged that the setting of calculating the additional feature values has been set in advance (step S77: YES route), the additional feature value calculator 5034 carries out the additional feature value calculation processing (step S79). While the details of the additional feature value calculation processing will be described later, the feature value calculation processing is completed when the additional feature value calculation processing is completed, and then the processing returns to the original processing.

As described hereinabove, the peak section pixel detection and the feature value calculation are carried out. Incidentally, when the averages (Lavr, aavr, bavr) of the color values of the pixels identified as pixels belonging to the peak are within the range of the predetermined color value of, for example, a skin color, a specific image may be corrected so that the pixels belonging to the peak have more desirable skin color. In this case, there is no need to calculate the feature values other than the averages.

Figure 8:
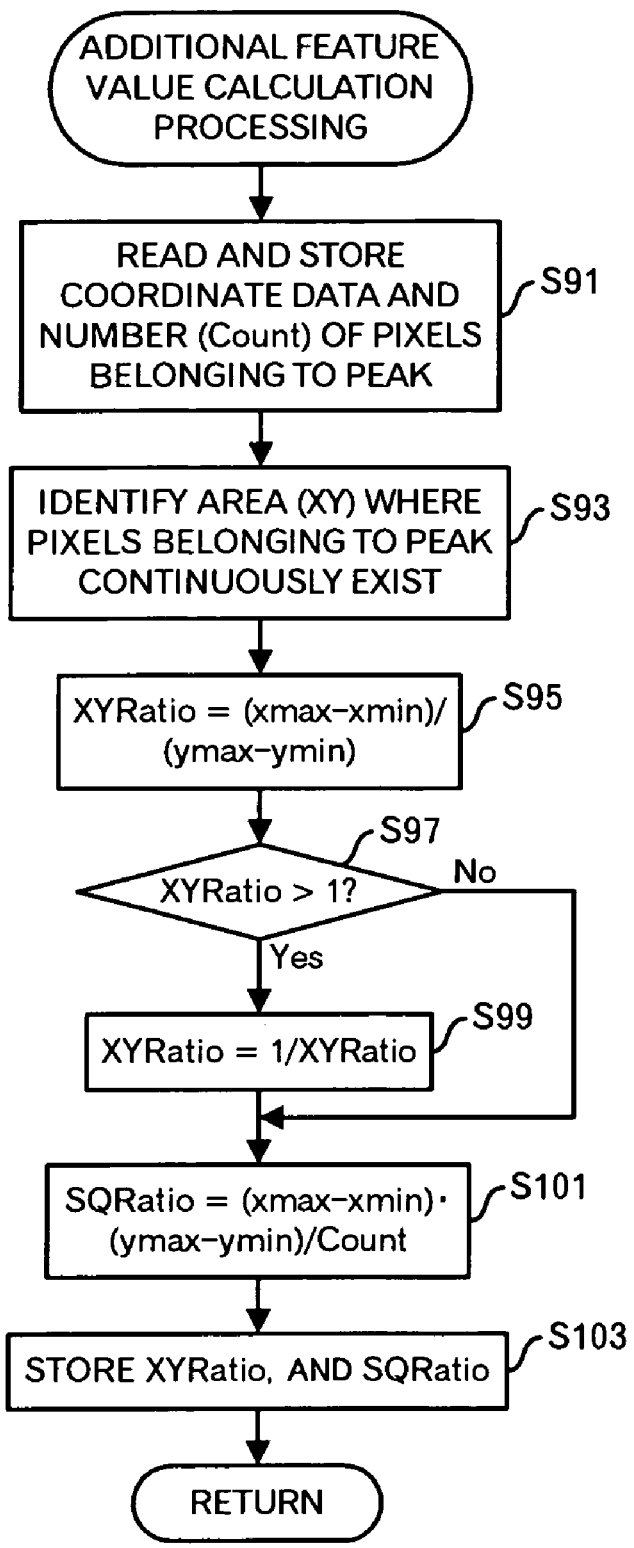
FIG. 8 is a diagram showing a processing flow of an additional feature value calculation processing.

Next, the details of the additional feature value calculation processing (FIG. 7: step S79) will be described with reference to FIG. 8. First, the additional feature value calculator 5034 reads the coordinate data and the number of pixels (Count) of the pixels belonging to the peak in a specific image with reference to the peak section pixel data storage 5024, and stores them into the storage device such as a work memory area (FIG. 8: step S91). It then identifies the area in which the pixels belonging to the peak exist continuously (step S93). For example, the additional feature value calculator 5034 identifies the area as an area XY on a two-dimensional plane defined by the x axis and the y axis. Incidentally, when determining the continuity of the pixels, for example, the color values of eight adjacent pixels are checked around a specific pixel.

Then, the additional feature value calculator 5034 calculates XYRatio (the aspect ratio of the area) by using an expression (6) shown below (step S95). Note here that xmax and xmin indicate the maximum value and the minimum value of the coordinate values in the x axis direction in the area XY, respectively, and ymax and ymin indicate the maximum value and the minimum value of the coordinate values in the y axis direction in the area XY, respectively.

$$XYRatio=(xmax-xmin)/(ymax-ymin) \quad (6)$$

Furthermore, the additional feature value calculator 5034 judges whether or not XYRatio calculated by the aforementioned expression (6) is greater than 1 (step S97). When XYRatio is judged not to be greater than 1 (in other words, not to exceed 1) (step S97: NO route), the processing progresses to a processing in step S101 described later. On the other hand, when XYRatio is determined to be greater than 1 (step S97: YES route), the additional feature value calculator 5034 sets a reciprocal (1/XYRatio) to XYRatio (step S99). More specifically, XYRatio is set to a value equal to or greater than 0 and equal to or less than 1.

Thereafter, the additional feature value calculator 5034 calculates SQRatio (the pixel density of the area) by using a following expression (7) (step S101):

$$SQRatio=(xmax-xmin)*(ymax-ymin)/Count \quad (7)$$

After the calculation of SQRatio, the additional feature value calculator 5034 stores XYRatio and SQRatio as additional feature values into the feature value storage 5040 (step S103). Then, the processing returns to the original processing.

In this manner, the additional feature value calculation processing is carried out. Thereby, when the area contains pixels contiguous to some extent and the aspect ratio of the shape is close to 1 (for example, when the area is likely to be a pixel group constituting, for example, a human face), the feature value is set to a relatively large value. In addition, the additional feature values calculated here are directly used as evaluation values without carrying out the evaluation value calculation processing based on these values. Moreover, by carrying out the correction using the additional feature values (namely, the evaluation values), it becomes possible to resolve the problem of the technique described in the Patent document 2 (more specifically, the problem that whether or not pixels considered to be of a skin color are scattered or concentrated on one place in an image does not affect the strength of correction).

Figure 9:
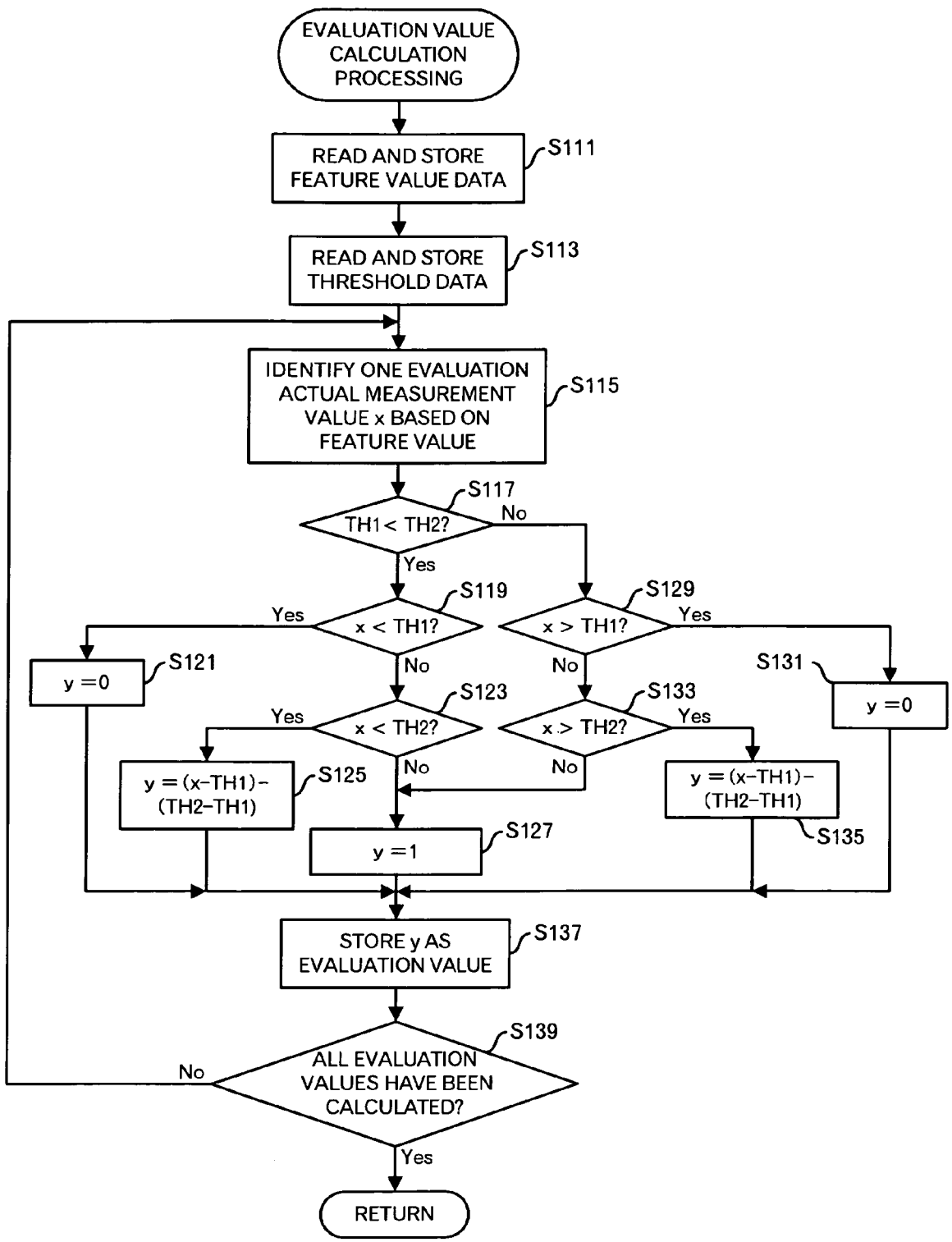
FIG. 9 is a diagram showing a processing flow of an evaluation value calculation processing.

Subsequently, the details of the evaluation value calculation processing (FIG. 2: step S13) will be described with reference to FIG. 9, FIG. 10A and FIG. 10B. First, the evaluation value calculator 5042 reads the feature value data from the feature value storage 5040, and temporarily stores it into the storage device such as a work memory area (FIG. 9: step S111). The feature value data includes Count, CountLoc, Lmin, Lmax, Lavr, aavr, and bavr.

Moreover, the evaluation value calculator 5042 reads preset threshold data, and temporarily stores it into the storage device such as a work memory area (step S113). The threshold data is data including an unrealistic value TH1 in association with a normal value TH2 for, for example, the following ten evaluation items: the upper limit of luminance (Lavr), the lower limit of luminance, the upper limit of chroma $((aavr^2+bavr^2)^{1/2})$, the lower limit of chroma, the upper limit of hue (atan2 (bavr, aavr), 0 to 360 deg.), the lower limit of hue, the upper limit of luminance width (Lmax−Lmin), the lower limit of luminance width, the upper limit of luminance maximum incidence rate (CountLoc/Count), and the lower limit of luminance maximum incidence rate. In other words, 20 thresholds exist here.

Then, the evaluation value calculator 5042 identifies one evaluation actual measurement value x based on the feature value (step S115). For example, when calculating the evaluation value of the upper limit or lower limit of luminance (Lavr), Lavr, which is one of the feature values, may be directly used and therefore Lavr is identified as x. In addition, for example, when calculating the evaluation value of the upper limit and lower limit of luminance width (Lmax−Lmin), the luminance width (Lmax−Lmin) is obtained from the feature values Lmin and Lmax as the feature values, and it is identified as x.

Thereafter, the evaluation value calculator 5042 compares TH1 and TH2, which are the thresholds of the evaluation item for which an evaluation value should be calculated, and judges whether or not TH1 is less than TH2 (step S117). Note here that TH1 less than TH2 means that, as a value comes close to TH1, in other words, as the value is decreasing, the value is more unrealistic and that TH1 and TH2 are thresholds for evaluating the lower limit.

When TH1 is judged to be less than TH2 (step S117: YES route), the evaluation value calculator 5042 judges whether or not x is less than TH1 (step S119). When x is judged to be less than TH1 (step S119: YES route), the evaluation value calculator 5042 sets 0 to an output value y (step S121). Then, the processing progresses to a processing in step S137 described later. On the other hand, when x is not judged to be less than TH1 (step S119: NO route), the evaluation value calculator 5042 judges whether or not x is less than TH2 (step S123). When x is judged to be less than TH2 (step S123: YES route), the evaluation value calculator 5042 calculates the output value y by using an expression (8) shown below (step S125). Then, the processing progresses to the processing in the step S137 described later.

$$y = (x - TH1) \div (TH2 - TH1) \tag{8}$$

On the other hand, when x is not determined to be less than TH2 (step S123: NO route), the evaluation value calculator 5042 sets 1 to the output value y (step S127). Thereafter, the processing progresses to the processing in the step S137 described later.

On the other hand, when it is judged that TH1 is not less than TH2 (step S117: NO route), the evaluation value calculator 5042 judges whether or not x is greater than TH1 (step S129). When x is judged to be greater than TH1 (step S129: YES route), the evaluation value calculator 5042 sets 0 to the output value y (step S131). Then, the processing progresses to the processing in the step S137 described later. On the other hand, when x is not judged to be greater than TH1 (step S129: NO route), the evaluation value calculator 5042 judges whether or not x is greater than TH2 (step S133). When x is judged to be greater than TH2 (step S133: YES route), the evaluation value calculator 5042 calculates the output value y by using the aforementioned expression (8) (step S135). Then, the processing progresses to the processing in the step S137 described later.

On the other hand, when x is determined not to be greater than TH2 (step S133: NO route), the processing progresses to the processing in the step S127. More specifically, the evaluation value calculator 5042 sets 1 to the output value y.

Then, the evaluated calculator 5042 stores y as the evaluation value of the evaluation item into the evaluation value storage 5044 (step S137). Moreover, the evaluation value calculator 5042 judges whether or not the evaluation values have been calculated for all the evaluation items (step S139). When the evaluation values have not been calculated for all the evaluation items (step S139: NO route) the processing returns to the processing of the step S115 to start the processing of the next evaluation item. On the other hand, when the evaluation values have been calculated for all the evaluation items (step S139: YES route), the evaluation value calculation processing is completed and the processing returns to the original processing.

Figure 10A:
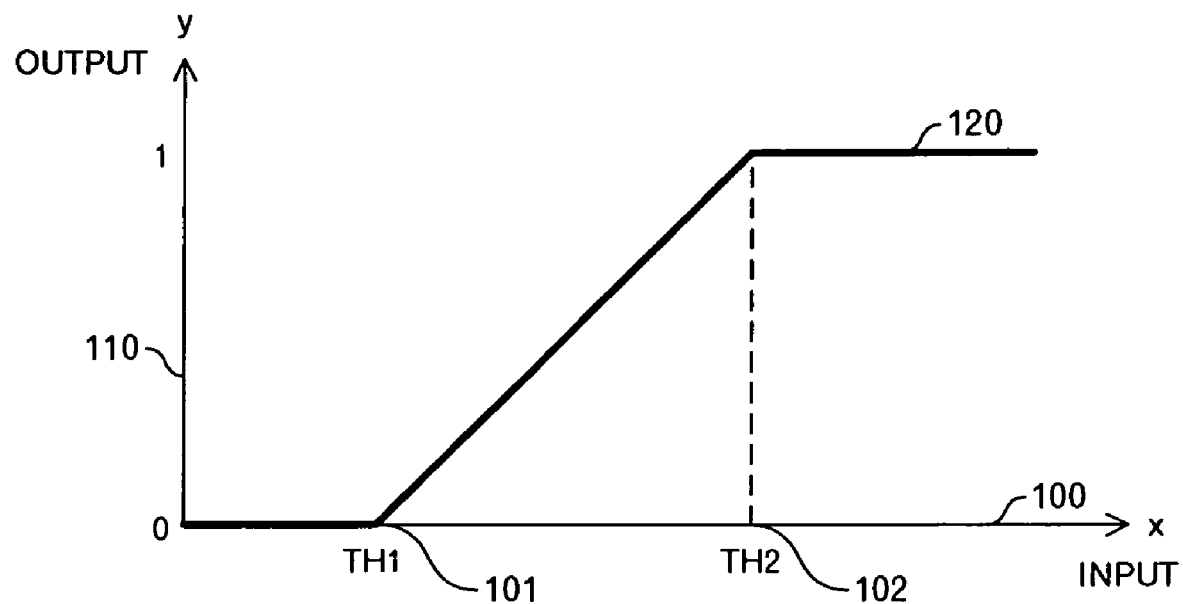
FIG. 10A is a conceptual diagram (Part 1) of the evaluation value calculation.
Figure 10B:
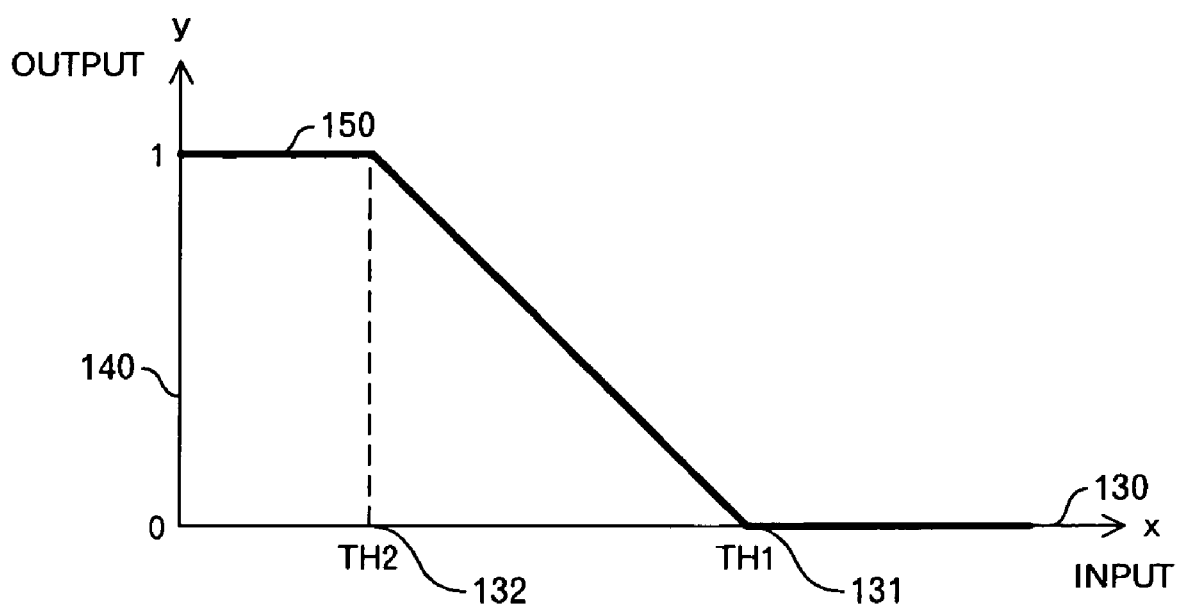
FIG. 10B is a conceptual diagram (Part 2) of the evaluation value calculation.

FIG. 10A and FIG. 10B each show a conceptual diagram of the evaluation value setting. FIG. 10A shows an x axis 100, a y axis 110, FIG. 10A, the TH1 value 101 (an unrealistic value) is less than the TH2 value 102 (a normal value), and thus FIG. 10A shows the setting of an evaluation value for a lower limit evaluation item. The output value curve 120, first, shows that the y value remains 0 while the x value is in the range of 0 to TH1. More specifically, when a value is less than the unrealistic value as a lower limit, it cannot be considered as an appropriate value and therefore the output value y (evaluation value) is set to 0. Furthermore, the output value curve 120 shows that the y value increases from 0 to 1 as the x value gets closer to TH2 from TH1 while the x value is within the range of TH1 to TH2. More specifically, the output value y (evaluation value) is set closer to 1 as a value is closer to the normal value. In addition, when a value is greater than TH2, which is the normal value, it is an appropriate value and therefore the output value y (evaluation value) is set to 1.

FIG. 10B shows an x axis 130, a y axis 140, a TH1 value 131, a TH2 value 132, and an output value curve 150. In FIG. 10B, the TH1 value 131 (an unrealistic value) is greater than the TH2 value 132 (a normal value), and thus FIG. 10B shows the setting of an evaluation value for an upper limit evaluation item. The output value curve 150, first, shows that the y value remains 1 while the x value is in the range of 0 to TH2. More specifically, when a value is less than the normal value as an upper limit, it can be considered as an appropriate value and therefore the output value y (evaluation value) is set to 1. Furthermore, the output value curve 150 shows that the y value decreases from 1 to 0 as the x value gets closer to TH1 from TH2 while the x value is within the range of TH2 to TH1. More specifically, the output value y (evaluation value) is set closer to 0 as a value is apart from the normal value. In addition, when a value is greater than TH1, which is the unrealistic value, it is considered as an inappropriate value and therefore the output value y (evaluation value) is set to 0.

In this manner, the evaluation value calculation processing is carried out. Thereby, the respective evaluation values are calculated for ten types of evaluation items, for example. Incidentally, the evaluation items are not limited to ten types, but other evaluation items may be provided.

Next, the details of the correction amount calculation processing (FIG. 2: step S19) will be described with reference to FIG. 11 to FIG. 21C. First, the correction amount calculator 5054 reads an average A(aavr, bavr) from the feature value storage 5040, a standard deviation S(STDc, STDh) from the standard deviation storage 5052, and a predetermined preferable color value K(aK, bK) from a setting value storage or the like, which is not shown, and stores them into the storage device such as a work memory area (FIG. 11: step S151) Incidentally, as for the average A(aavr, bavr) and the standard deviation S(STDc, STDh), the correction amount calculator 5054 reads the values each corresponding to the peak having the maximum probability by referring to data stored in the probability storage 5048. In addition, the predetermined preferable color value K(ak, bk) is a color value corresponding to, for example, an ideal skin color (in other words, a skin color target value). In this embodiment, the average A(aavr, bavr) and the preferable color value K(ak, bk) each include an $a^*$ value and a $b^*$ value in the CIELAB color system to simplify the description. Further, they may include an $L^*$ value in some cases.

Then, the correction amount calculator 5054 calculates a basic correction amount C(Cc, Ch) and stores it into the storage device such as a work memory area (step S153). The basic correction amount C(Cc, Ch) is calculated on the basis of the difference between the preferable color value K(ak, bk) and the average A(aavr, bavr). The same expressions as the expressions (3) and (4) described above are used for the calculation method.

Figure 12:
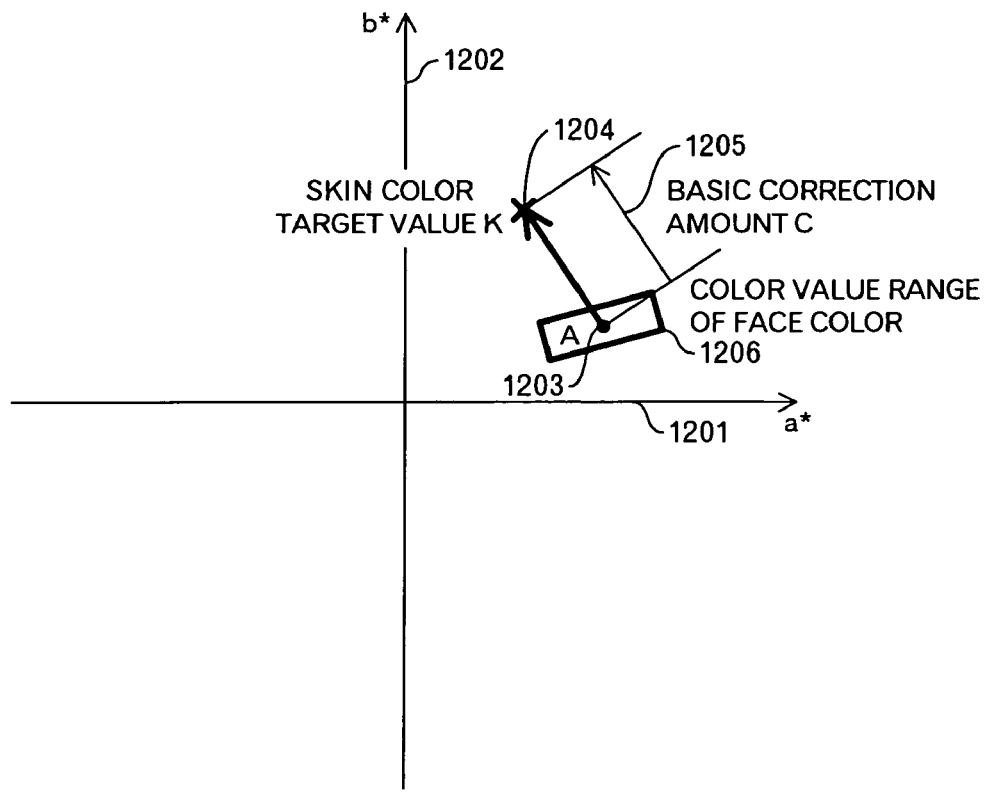
FIG. 12 is a conceptual diagram of a basic correction amount.

FIG. 12 shows a conceptual diagram of the basic correction amount. The example of FIG. 12 shows a color space extending with an a* axis 1201 and a b* axis 1202 corresponding to a* and b*, respectively, which are color components of the CIELAB color system. Moreover, on this color space, there are shown a point 1203 indicating the average A(aavr, bavr), a point 1204 indicating the skin color target value K(ka, kb), a vector 1205 corresponding to the basic correction amount C, and a rectangle 1206 indicating the color value range of a face color. The vector 1205 corresponding to the basic correction amount C is a vector from the average A(aavr, bavr) to the skin color target value K(ka, kb). Incidentally, the vector 1205 corresponding to the basic correction amount C can be decomposed into the basic correction amount Cc in the chroma component and the basic correction amount Ch in the hue component. The center (an intersection of diagonal lines) of the rectangle 1206 indicating the color value range of the face color is the average A(aavr, bavr), and the long side is equal to twice the standard deviation STDc in the chroma component and the short side is equal to twice the standard deviation STDh in the hue component. For example, for a pixel in the image data, which has a color value contained in the range indicated by the rectangle 1206 indicating the color value range of the face color, the correction may be carried out according to the vector 1205 corresponding to the basic correction amount C. Incidentally, while the length equal to twice the standard deviation is used as a reference considered as the color value range of the face color in this embodiment, other references may also be used.

Figure 11:
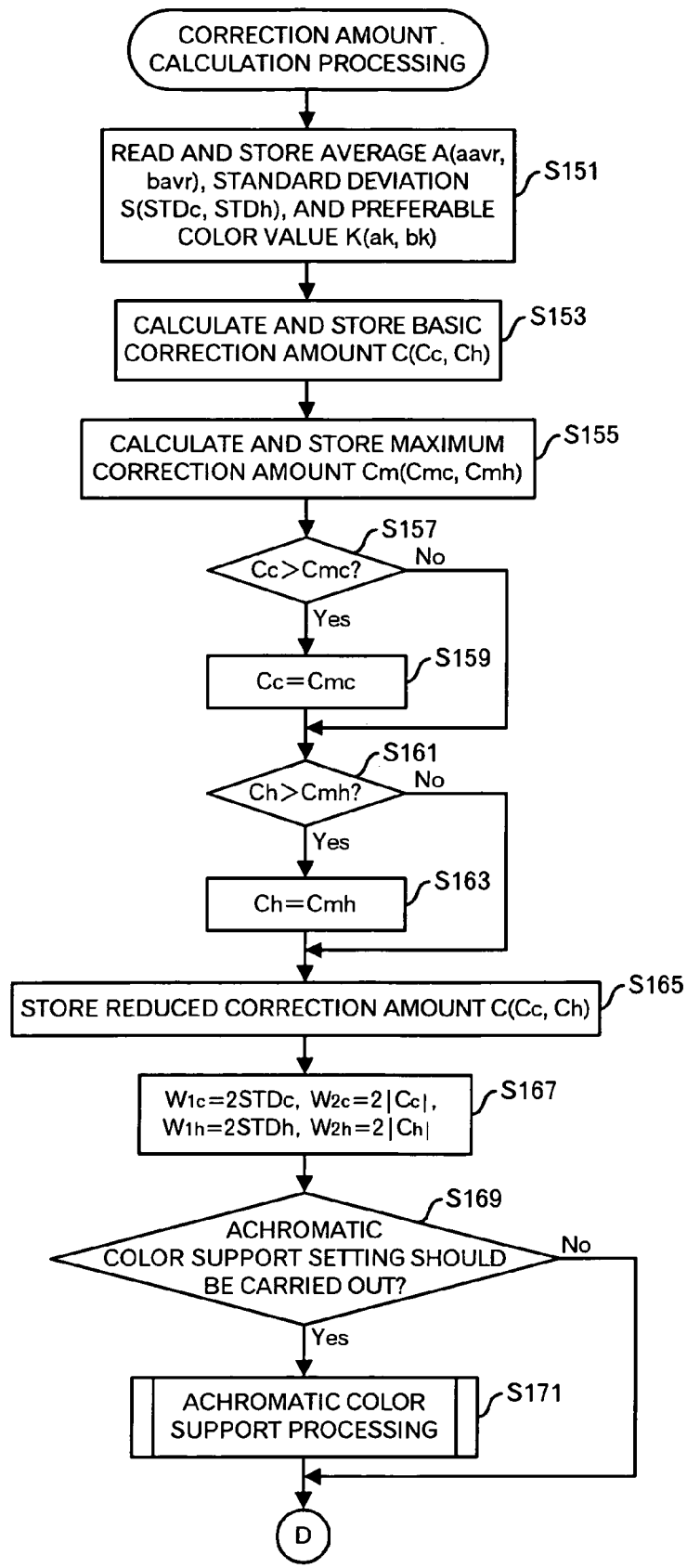
FIG. 11 is a diagram showing a processing flow (Part 1) of a correction amount calculation processing.

Returning to the description of FIG. 11, the correction amount calculator 5054 calculates the maximum correction amount Cm(Cmc, Cmh) and stores it into the storage device such as a work memory area (FIG. 11: step S155). For the calculation of the maximum correction amount Cm, a predetermined maximum correction amount reference value and the probability calculated in the above are used. For example, the maximum correction amount reference value is set to 10 in advance (absolute value) and, when the probability is 0.5, 5 (10×0.5) is obtained. The maximum correction amount Cm includes the maximum correction amount Cmc in the chroma component and the maximum correction amount Cmh in the hue component, and therefore the correction amount is calculated as described above for each of the chroma component and the hue component.

Thereafter, the correction amount calculator 5054 compares the basic correction amount Cc in the chroma component with the maximum correction amount Cmc, and judges whether or not Cc>Cmc is satisfied (step S157). When it is judged that Cc>Cmc is not satisfied (step S157: NO route), the processing progresses to a processing in step S161 described later. On the other hand, when it is judged that Cc>Cmc is satisfied (step S157: YES route), the correction amount calculator 5054 sets the Cmc value to Cc (step S159).

Furthermore, the correction amount calculator 5054 compares the basic correction amount Ch in the hue component with the maximum correction amount Cmh, and judges whether or not Ch>Cmh is satisfied (step S161). When it is judged that Ch>Cmh is not satisfied (step S161: NO route), the processing progresses to the processing in the step S165 described later. On the other hand, when it is judged that Ch>Cmh is satisfied (step S161: YES route), the correction amount calculator 5054 sets the Cmh value to Ch (step S163). Thereafter, the correction amount calculator 5054 stores a reduced correction amount C(Cc, Ch) into the storage device such as a work memory area (step S165). Incidentally, in the subsequent description, the basic correction amount C to which the maximum correction amount Cm is set is referred to as a reduced correction amount C.

Figure 13:
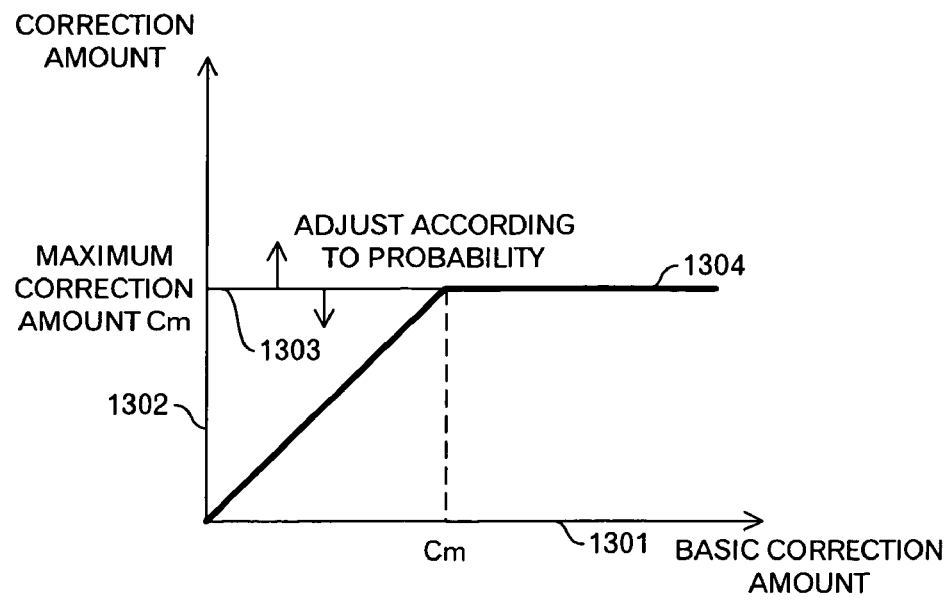
FIG. 13 is a conceptual diagram of a reduced correction amount.

FIG. 13 shows a conceptual diagram of the reduced correction amount. FIG. 13 shows an abscissa axis 1301 corresponding to the basic correction amount, an ordinate axis 1302 corresponding to the reduced correction amount, a line 1303 indicating the maximum correction amount Cm, and a curve 1304 indicating the reduced correction amount C. The curve 1304 indicating the reduced correction amount C shows that the basic correction amount is directly used as the reduced correction amount C, while the basic correction amount is equal to or less than the maximum correction amount Cm. Moreover, the curve 1304 indicating the reduced correction amount C shows that the maximum correction amount Cm is used as the reduced correction amount C, when the basic correction amount exceeds the maximum correction amount Cm. More specifically, to the reduced correction amount C set in this manner a value exceeding the maximum correction amount Cm is never set.

Figure 14:
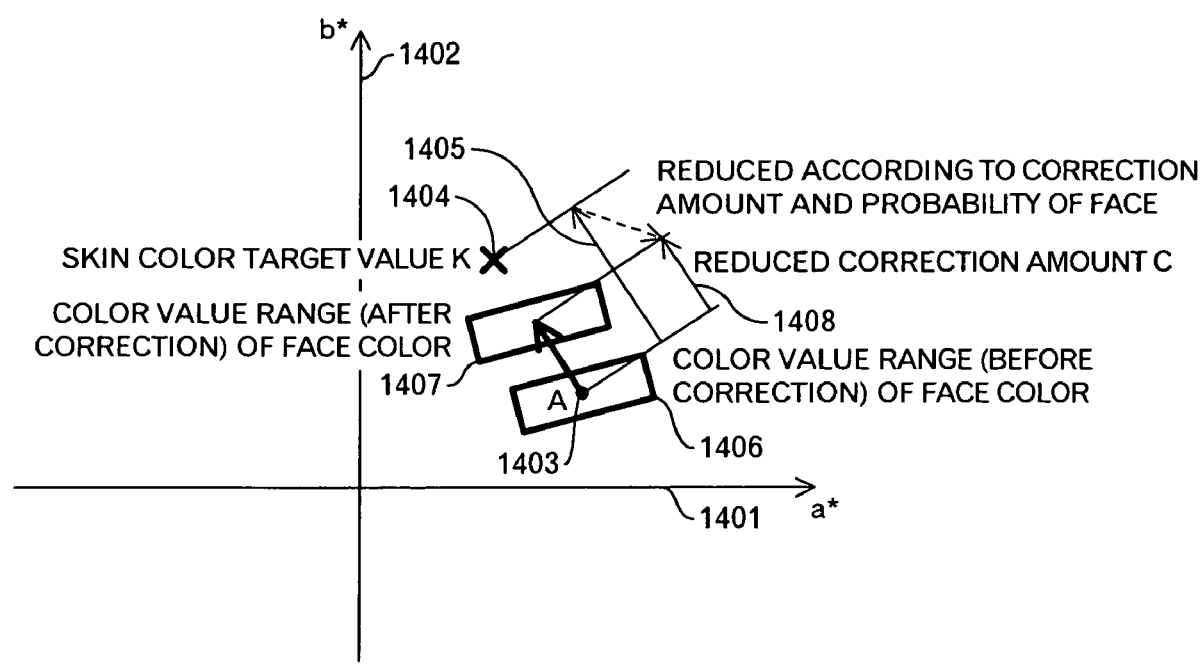
FIG. 14 is a conceptual diagram of a correction using the reduced correction amount.

FIG. 14 shows a conceptual diagram of the correction using the reduced correction amount. The example of FIG. 14 shows a color space extending with an a* axis 1401 and a b* axis 1402 corresponding to a* and b*, respectively, which are color components of the CIELAB color system, in the same manner as in FIG. 12. Moreover, in the color space, there are shown a point 1403 indicating the average A(aavr, bavr), a point 1404 indicating the skin color target value K(ka, kb), a vector 1405 corresponding to the basic correction amount, a rectangle 1406 indicating the color value range of a face color before correction, a rectangle 1407 indicating the color value range of the face color after the correction, and a vector 1408 corresponding to the reduced correction amount C. In comparison with the length of the vector 1405 corresponding to the basic correction amount, the length of the vector 1408 corresponding to the reduced correction amount C is short, and thus it is indicated that the correction amount is reduced. For example, when Cc>Cmc and Ch>Cmh are satisfied and the Cm value is set to the basic correction amount, the correction amount is reduced in this manner. For example, the pixels in the image data, which have color values contained in the rectangle 1406, which indicates the color value range of a face color, are corrected according to the vector 1408 corresponding to the reduced correction amount C, and the result of the correction is represented by the rectangle 1407, which indicates the color value range of the face color after the correction. The reason why the correction amount is reduced is to prevent the user from feeling odd when viewing the corrected image due to an extremely large correction.

Returning to the description of FIG. 11, the correction amount calculator 5054 sets values to correction range setting variables W1c, W2c, W1h, and W2h according to the following expression (9) (FIG. 11: step S167):

$$W1c = 2STDc, W2c = 2|Cc| \qquad (9)$$
$$W1h = 2STDh, W2h = 2|Ch|$$

Thereafter, the correction amount calculator 5054 judges whether or not it is set in advance that achromatic color support setting should be made (step S169). When it is judged not to be set in advance that the achromatic color support setting should be made (step S169: NO route), the processing progresses to a processing of FIG. 15 via a terminal D. On the other hand, when it is judged to be set in advance that the achromatic color support setting should be made (step S169: YES route), the correction amount calculator 5054 carried out the achromatic color support processing (step S171). While details of the achromatic color support processing will be described later, it is processing for reducing the range of the color values to be corrected or the correction amount, and the processing is executed for at least one of the chroma component (c) and the hue component (h), for example. After the completion of the achromatic color support processing, the processing progresses to the processing of FIG. 15 via the terminal D.

Figure 15:
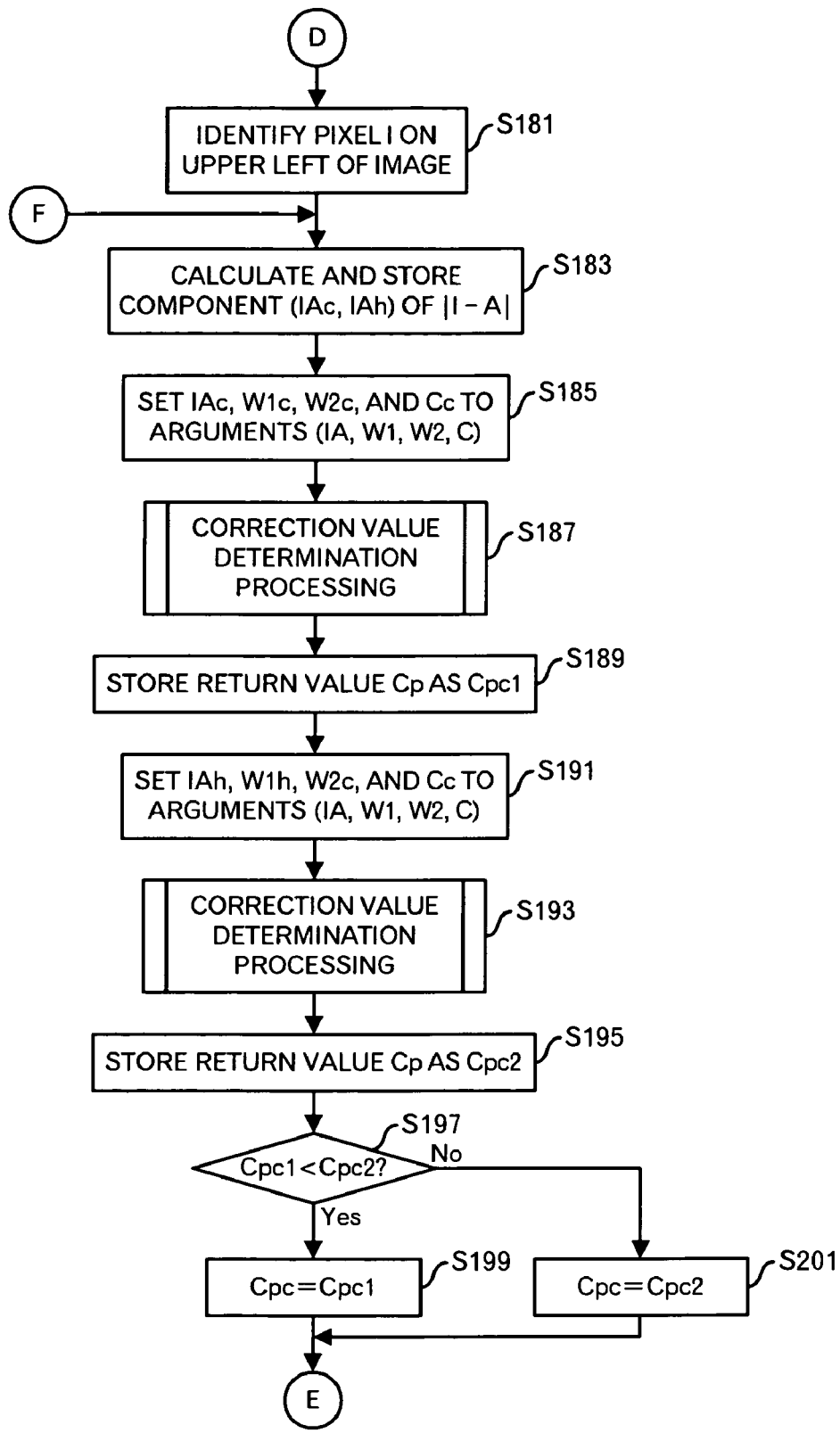
FIG. 15 is a diagram showing a processing flow (Part 2) of the correction amount calculation processing.
Figure 16:
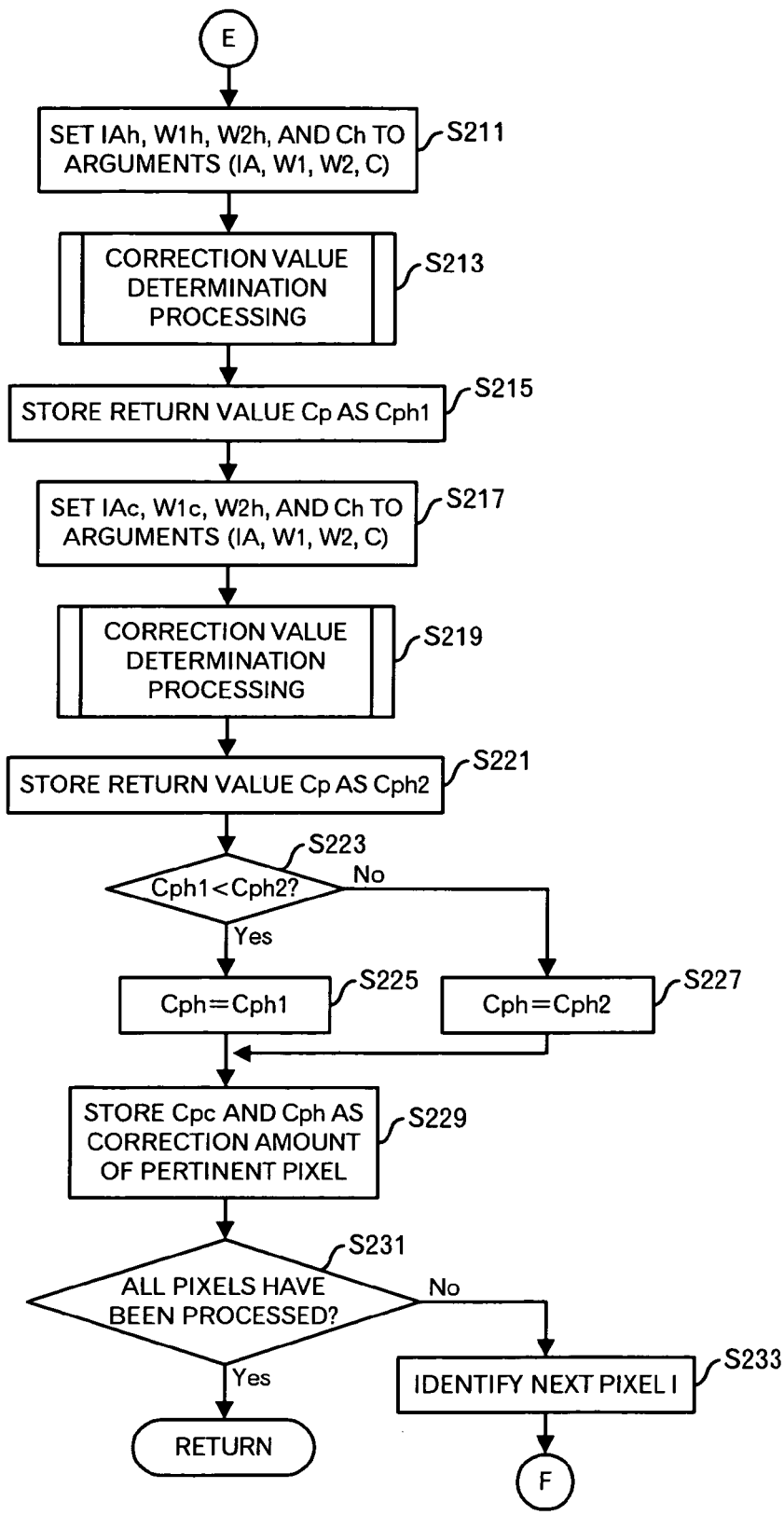
FIG. 16 is a diagram showing a processing flow (Part 3) of the correction amount calculation processing.

FIG. 15 and FIG. 16 each show a processing after the processing progresses to the processing via the terminal D. The correction amount calculator 5054 reads specific image data from the converted image data storage 5008, and identifies a pixel I on the upper left of the image (FIG. 15: step S181). The correction amount calculator 5054 then calculates a chroma component value IAc and a hue component value IAh of the pixel I on the basis of the coordinate values of the pixel I and the average A, and stores them into the storage device such as a work memory area (step S183). As for the calculation method for the chroma component value IAc and the hue component value IAh, the same expressions as the expressions (3) and (4) described above are used.

Thereafter, the correction amount calculator 5054 sets IAc, W1$c$, W2$c$, and Cc to arguments IA, W1, W2, and C used in a correction value determination processing, which will be described later, respectively (step S185). The correction amount calculator 5054 then carries out the correction value determination processing on the basis of the arguments set in the above (step S187). While details of the correction value determination processing will be described later, a return value Cp is returned upon the execution of the correction value determination processing. The correction amount calculator 5054 stores the return value Cp in the step S187 as Cpc1 into the storage device such as a work memory area (step S189).

Furthermore, the correction amount calculator 5054 sets IAh, W1$h$, W2$c$, and Cc to the arguments IA, W1, W2, and C used in the correction value determination processing, respectively (step S191). Thereafter, the correction amount calculator 5054 carries out the correction value determination processing on the basis of the arguments set in the above (step S193). The correction amount calculator 5054 stores the return value Cp in the step S193 as Cpc2 into the storage device such as a work memory area (step S195).

Thereafter, the correction amount calculator 5054 compares Cpc1 with Cpc2, and judges whether or not Cpc1<Cpc2 is satisfied (step S197). When Cpc1<Cpc2 is judged to be satisfied (step S197: YES route), the correction amount calculator 5054 sets the Cpc1 value to the predetermined variable Cpc (step S199). Then, the processing progresses to a processing of FIG. 16 via a terminal E. On the other hand, when Cpc1<Cpc2 is judged not to be satisfied (step S197: NO route), the correction amount calculator 5054 sets the CPc2 value to the predetermined variable Cpc (step pS201). Then, the processing progresses to the processing of FIG. 16 via the terminal E.

Furthermore, the correction amount calculator 5054 sets IAh, W1$h$, W2$h$, and Ch to the arguments IA, W1, W2, and C used in the correction value determination processing, respectively (FIG. 16: step S211). Then, the correction amount calculator 5054 carries out the correction value determination processing on the basis of the arguments set in the above (step S213). The correction value calculator 5054 stores the return value Cp in the step S213 as Cph1 into the storage device such as a work memory area (step S215).

Thereafter, the correction amount calculator 5054 sets IAc, W1$c$, W2$h$, and Ch to the arguments IA, W1, W2, and C used in the correction value determination processing, respectively (step S217). The correction amount calculator 5054 then carries out the correction value determination processing on the basis of the arguments set in the above (step S219). The correction amount calculator 5054 stores the return value Cp in the step S219 as Cph2 into the storage device such as a work memory area (step S221).

Thereafter, the correction amount calculator 5054 compares Cph1 with Cph2, and judges whether or not Cph1<Cph2 is satisfied (step S223). When Cph1<Cph2 is judged to be satisfied (step S223: YES route), the correction amount calculator 5054 sets the Cph1 value to the predetermined variable Cph (step S225). Then, the processing progresses to step S229 described later. On the other hand, when Cph1<Cph2 is determined not to be satisfied (step S223: NO route), the correction amount calculator 5054 sets the Cph2 value to the predetermined variable Cph (step S227).

Thereafter, the correction amount calculator 5054 stores Cpc and Cph in association with pixel data as correction amounts of the corresponding pixel into the correction amount storage 5056 (step S229). As described hereinabove, because the processing for one pixel has been completed, the correction amount calculator 5054 judges whether or not the processing for all pixels has been completed (step S231). When it is not determined that the processing for all pixels has been completed (step S231: NO route), the correction amount calculator 5054 identifies the next unprocessed pixel I (step S233). Then, the processing returns to the processing of step S183 (FIG. 15).

On the other hand, when it is not judged that the processing for all pixels has been completed (step S231: YES route), the correction amount calculation processing is completed and the control returns to the original processing.

Herewith, the correction amount of each pixel in the image is calculated. Although the correction amount data of each pixel is stored in the step S229, the correction amount data may be stored collectively after the completion of the processing for all pixels.

Figure 17:
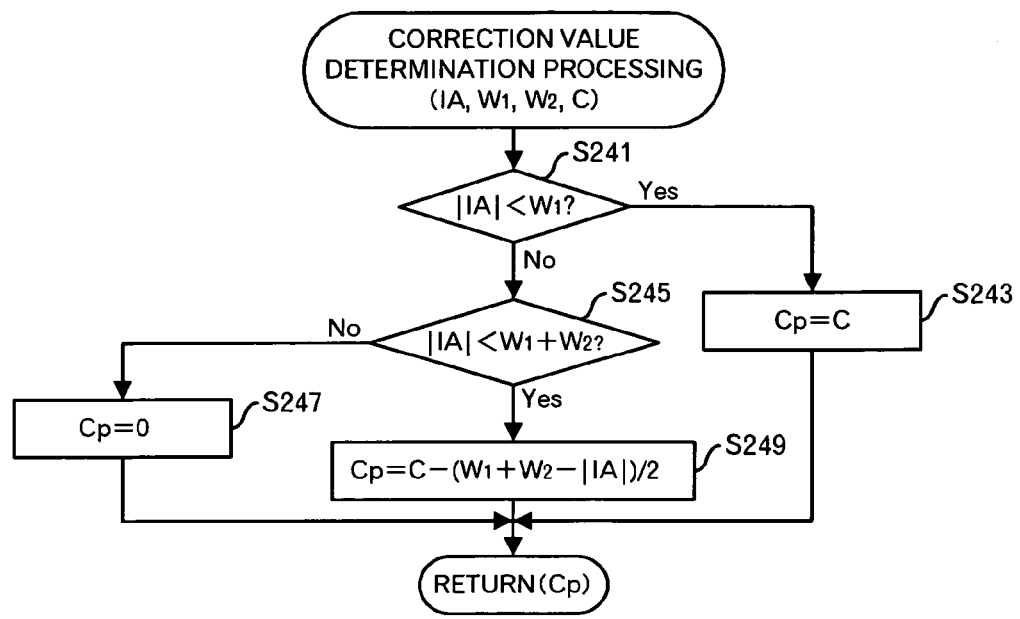
FIG. 17 is a diagram showing a processing flow of a correction value determination processing.

The details of the correction value determination processing will be described with reference to FIG. 17. As described in the above, it is assumed that the IA, W1, W2, and C values are given as arguments in the correction value determination processing. First, the correction amount calculator 5054 judges whether or not |IA|<W1 is satisfied (FIG. 17: step S241). When |IA|<W1 is judged to be satisfied (step S241: YES route), the correction amount calculator 5054 sets the C value to the return value Cp (step S243). Then, the control returns to the original processing. More specifically, when the pixel I is considered to be sufficiently close to the average A in the component value currently checked as a processing target, the correction amount is not reduced (the correction amount is the same as the correction amount of the pixel having the average A).

On the other hand, when |IA|<W1 is judged not to be satisfied (step S241: NO route), the correction amount calculator 5054 judges whether or not |IA|<W1+W2 is satisfied (step S245). When |IA|<W1+W2 is judged to be satisfied (step S245: YES route), the correction amount calculator 5054 sets the value of C−(W1+W2−|IA|)/2 to the return value Cp (step S249). Thereafter, the control returns to the original processing. More specifically, when the pixel I is considered to be different from the average A to some extent in the component value currently checked as a processing target, the correction amount is reduced according to the difference level.

On the other hand, when |IA|<W1+W2 is judged not to be satisfied (step S245: NO route), the correction amount calculator 5054 sets 0 to the return value Cp (step S247). Then, the control returns to the original processing. More specifically, when the pixel I is considered to be different from the average A more excessively than a certain level in the component value currently checked as the processing target, the correction is not carried out. As described above, the correction value determination processing is carried out and the return value Cp is determined.

Figure 18:
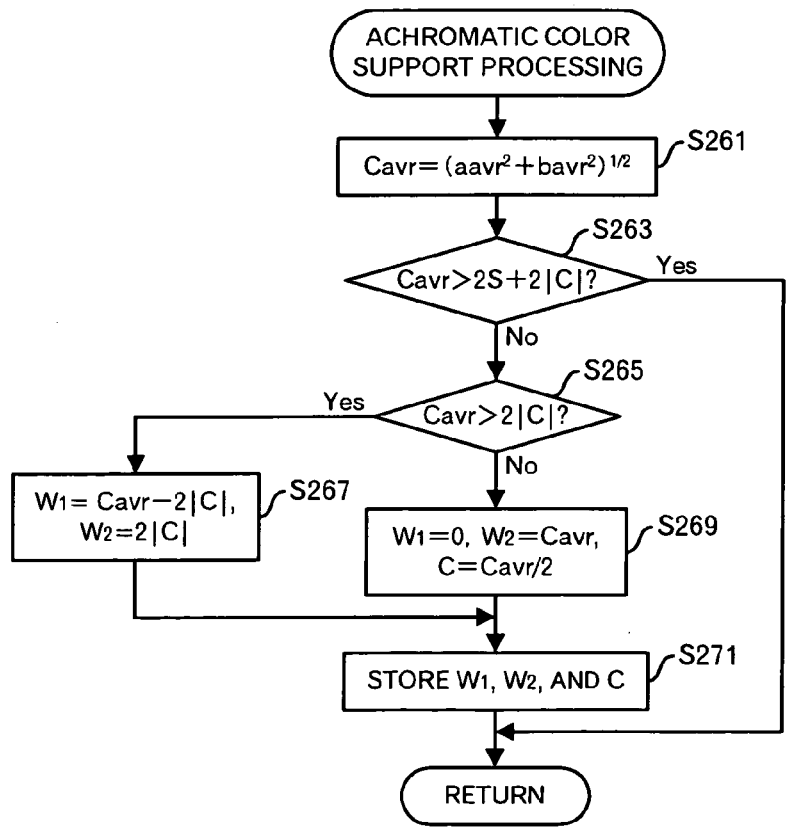
FIG. 18 is a diagram showing a processing flow of an achromatic color support processing.

Next, the details of the achromatic color support processing (FIG. 11: step S171) will be described with reference to FIG. 18. First, the correction amount calculator 5054 sets the value of $(aavr^2+bavr^2)^{1/2}$ to a predetermined variable Cavr (step S261). Thereafter, it judges whether or not Cavr>2S+2|C| is satisfied (step S263). When Cavr>2S+2|C| is determined to be satisfied (step S263: YES route), the achromatic color support processing is completed and the control returns to the original processing.

On the other hand, when Cavr>2S+2|C| is judged not to be satisfied (step S263: NO route), the correction amount calculator 5054 judges whether or not Cavr>2|C| is satisfied (step S265). When Cavr>2|C| is judged to be satisfied (step S265: YES route), the correction amount calculator 5054 sets the Cavr−2|C| value to W1, and sets the 2|C| value to W2 (step S267). Thereafter, the processing progresses to a processing of step S271 described later. On the other hand, when Cavr>2|C| is judged not to be satisfied (step S265: NO route), the correction amount calculator 5054 sets 0, the Cavr value, and the Cavr/2 value to W1, W2, and C, respectively (step S269). Thereafter, the correction amount calculator 5054 stores the W1, W2, and C values into the storage device such as a work memory area (step S271). Thereafter, the achromatic color support processing is completed and the control returns to the original processing.

Herewith, the achromatic color support processing is carried out to change the reference value used in identifying a pixel to be corrected. This allows a prevention of correcting the pixel, for example, having the color value of an achromatic color as far as possible.

Figure 19:
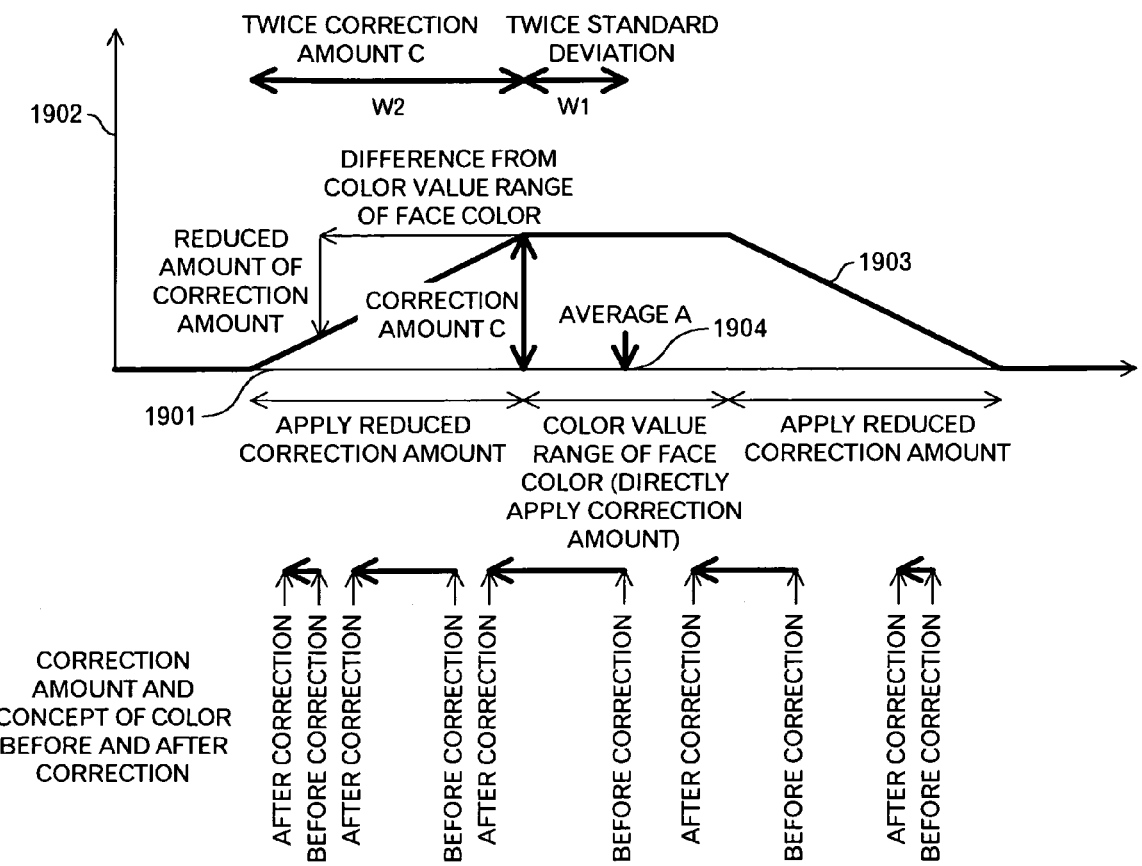
FIG. 19 is a conceptual diagram of a correction amount determination method.

FIG. 19 shows a conceptual diagram of the correction amount determination method. FIG. 19 shows how the correction amount of a certain pixel I is determined for the chroma component or the hue component. FIG. 19 shows an axis 1901 corresponding to an IA value, an axis 1902 corresponding to a correction amount, a correction amount curve 1903, and a point 1904 corresponding to an average A. Here, the IA value is a decomposed value of a difference in the color value between the certain pixel I and the average A, in each component. For example, it is the value of IAc, which is a difference in the chroma component (c). The correction amount is determined according to the IA value. In this embodiment, the IA value at the point 1904 corresponding to the average A is assumed to be 0, for example. More specifically, the IA values on the left of the point 1904 corresponding to the average A are negative values and the IA values on the right of the point 1904 are positive values.

Looking the correction amount curve 1903 from the left end, first it is shown that the correction amount remains 0 (not corrected) from the left end up to a certain point. Thereafter, it is shown that, when the IA value gradually increases (the absolute value decreases) and thereby the absolute value of the IA value becomes less than W2+W1, an effective correction amount is set, and the correction amount increases with the decrease of the absolute value of the IA value. Moreover, it is shown that, when the absolute value of the IA value decreases and becomes less than W1, the correction amount C (the correction amount of the pixel having the average A) is set. Note here that, even if the IA value increases further, it is indicated that the correction amount does not exceed C, but C is set to the correction amount until the IA value exceeds W1.

After the IA value exceeds W1, the correction amount decreases with the increase of the IA value. Thereafter, the IA value exceeds W1+W2, it is indicated that the correction amount becomes 0 (not corrected).

In this manner, the correction amount for the pixel I is determined according to the difference in color value between the average A and the pixel I. More specifically, the same correction amount as for a pixel having the average A is made for a pixel having a color value considered to be sufficiently close to the average A, a reduced correction amount according to the distance from the average A is made for a pixel having a color value considered to be close to the average A to some extent, and no correction is made for a pixel having a color value considered to be far from the average A more excessively than a certain level.

Figure 20:
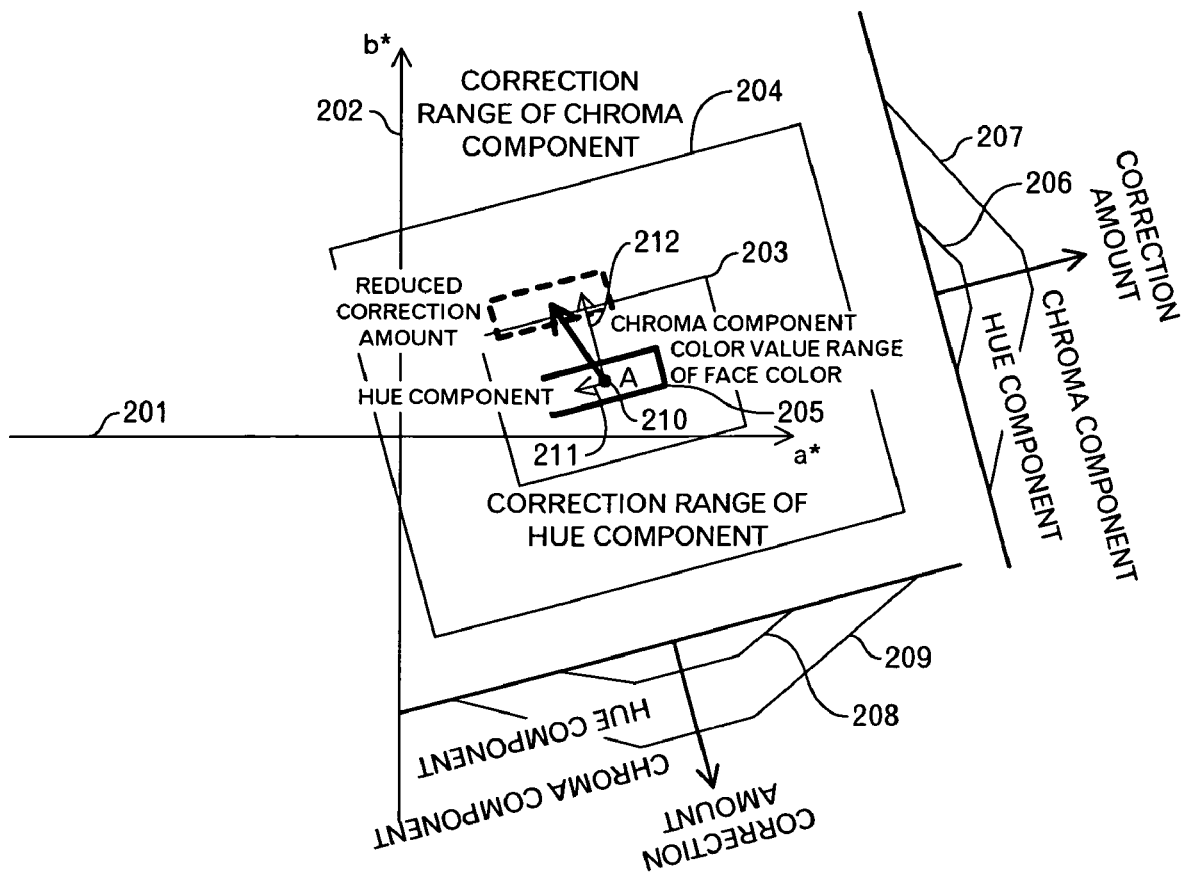
FIG. 20 is a conceptual diagram of a correction target range.

FIG. 20 shows a conceptual diagram of a corrected target range. The example of FIG. 20 shows a color space extending with an a* axis 201 and a b* axis 202 corresponding to a* and b*, respectively, which are color components of the CIELAB color system. On the color space, there are shown a point 210 indicating an average A(aavr, bavr), a vector 211 corresponding to the reduced correction amount Cc, a vector 212 corresponding to the reduced correction amount Ch, a first rectangle 205, a second rectangle 203, a third rectangle 204, curves 206 and 208 indicating the correction amounts in the chroma component, and curves 207 and 209 indicating correction amounts in the hue component.

The first rectangle 205 indicates a color value range of a face color. In the first rectangle 205, the center (the intersection of diagonal lines) indicates the average A(aavr, bavr), and the long side is equal to twice the standard deviation STDc in the chroma component and further equal to the upper base (short side) of the trapezoid indicated by the curve 208 representing the correction amount in the chroma component and to the upper base (short side) of the trapezoid indicated by the curve 209 representing the correction amount in the hue component. Moreover, the short side of the first rectangle 205 is equal to twice the standard deviation STDh in the hue component and further equal to the upper base (short side) of the trapezoid indicated by the curve 206 representing the correction amount in the chroma component and to the upper base (short side) of the trapezoid indicated by the curve 207 representing the correction amount in the hue component. The upper base of each trapezoid indicated by the curve representing the correction amount in each component corresponds to the maximum correction amount (the same correction amount as the pixel having the average A) and indicates that a pixel having a color value contained in this first rectangle 205 is corrected by the same amount as for the pixel having the average A.

The second rectangle 203 indicates the color value range of colors to be corrected in the chroma component and the hue component. The long side of the second rectangle 203 is equal to twice the standard deviation STDc in the chroma component plus twice the reduced correction amount |Cc| in the chroma component and equal to the length of the lower base (long side) of the trapezoid indicated by the curve 208 representing the correction amount in the chroma component. Moreover, the short side of the second rectangle 203 is equal to twice the standard deviation STDh in the hue component plus twice the reduced correction amount |Cc| in the chroma component and equal to the length of the lower base (long side) of the trapezoid indicated by the curve 206 representing the correction amount in the chroma component. It indicates that a pixel having a color value not contained in the second rectangle 203 is not corrected in the chroma component.

The third rectangle 204 indicates the color value range of colors to be corrected in the hue component. The long side of the third rectangle 204 is equal to twice the standard deviation STDc in the chroma component plus twice the reduced correction amount |Ch| in the hue component and equal to the length of the lower base (long side) of the trapezoid indicated by the curve 209 representing the correction amount in the hue component. Moreover, the short side of the third rectangle 204 is equal to twice the standard deviation STDh in the hue component plus twice the reduced correction amount |Ch| in the hue component and equal to the length of the lower base (long side) of the trapezoid indicated by the curve 207 representing the correction amount in the hue component. It indicates that a pixel having a color value not contained in the third rectangle 204 is not corrected. The setting of the correction target range as described above is achieved by the correction amount calculation processing shown in FIG. 11 to FIG. 17.

Figure 21A:
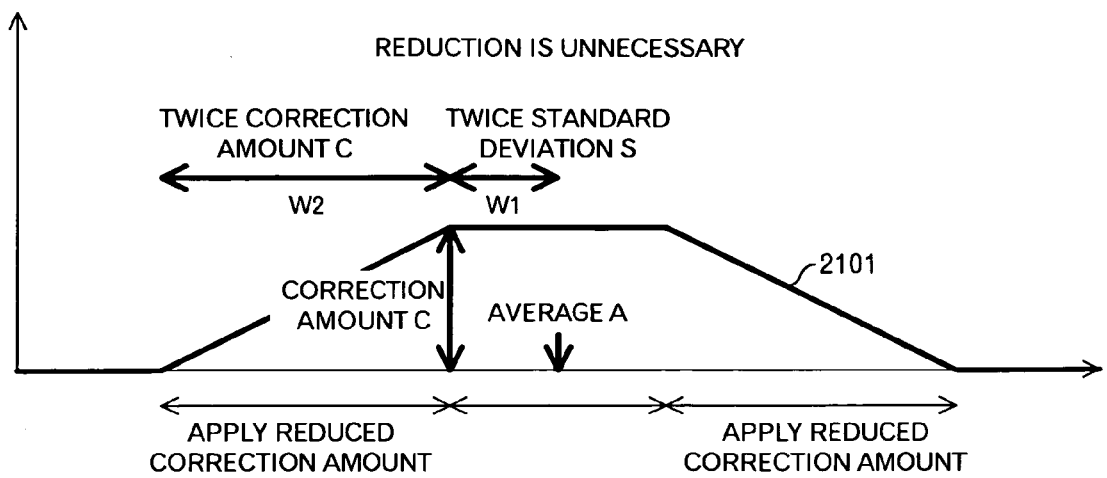
FIG. 21A is a conceptual diagram (Part 1) of a correction range and a reduction in the correction amount.
Figure 21B:
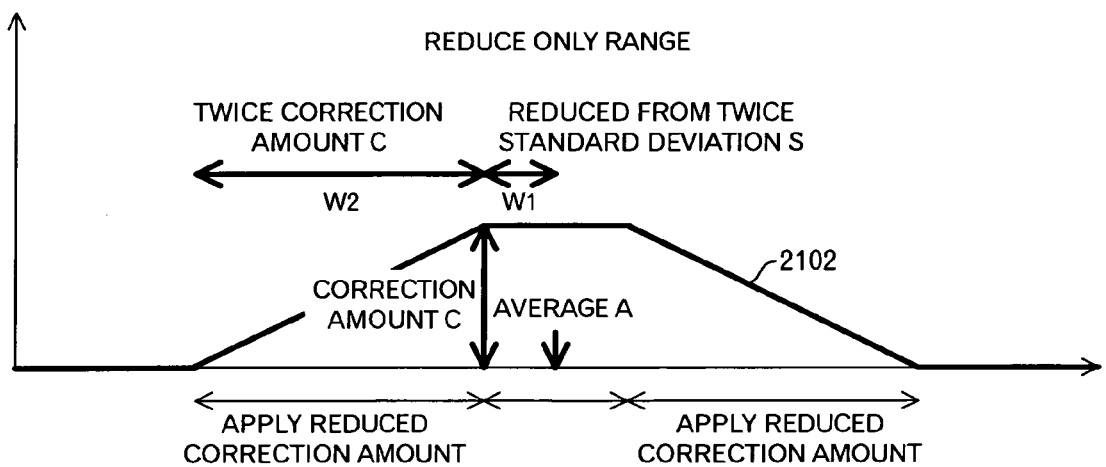
FIG. 21B is a conceptual diagram (Part 2) of a correction range and a reduction in the correction amount.
Figure 21C:
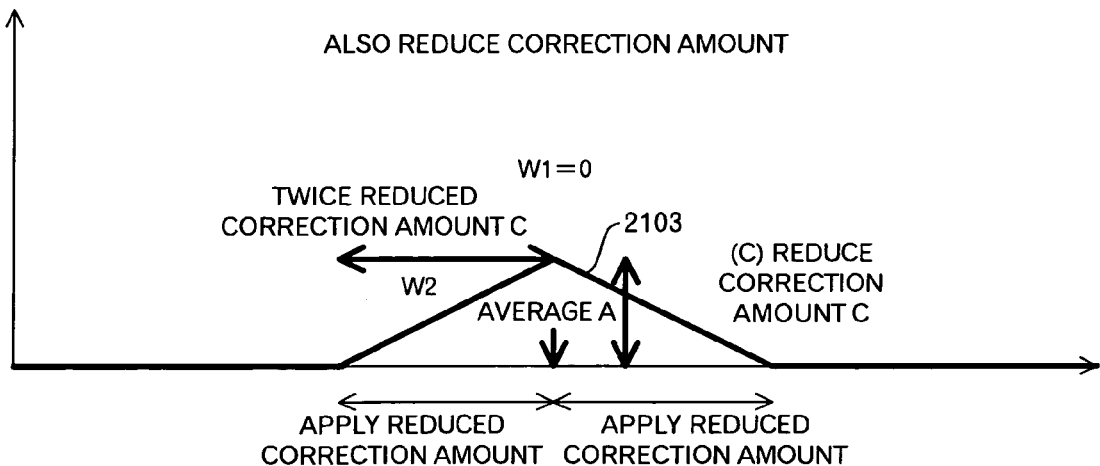
FIG. 21C is a conceptual diagram (Part 3) of a correction range and a reduction in the correction amount.

Next, FIG. 21A, FIG. 21B, and FIG. 21C each show a conceptual diagram of a correction range and a reduction in correction amount. The correction range reduction is carried out by setting a reduced value to at least one of the correction range setting variables W1$c$, W2$c$, W1$h$, and W2$h$. The correction amount reduction is carried out by setting a further reduced value at least one of the reduced correction amounts Cc and Ch. In this embodiment, the settings are carried out by the achromatic color support processing shown in FIG. 18.

FIG. 21A shows a correction amount curve 2101. The correction amount curve 2101 represents a correction range and a correction amount for the case where the achromatic color support processing is not carried out. The components and variable values in FIG. 21A are the same as those in FIG. 19 and therefore their detailed description is omitted here, while FIG. 21A shows an example for one of the chroma component and the hue component. Therefore, the components are not particularly identified hereinafter. FIG. 21B shows a correction amount curve 2102. The correction amount curve 2102 has a narrow IA range, in which the correction amount becomes C, in comparison with the correction amount curve 2101 (FIG. 21A). This represents the case where W1 is set to a value less than twice the standard deviation S by the achromatic color support processing.

FIG. 21C shows a correction amount curve 2103. The correction amount curve 2103 has a wide IA range, in which the correction amount becomes 0, in comparison with the correction amount curve 2101 (FIG. 21A) and the maximum value of the correction amount is lower. Furthermore, the IA range, in which the correction amount becomes maximum, corresponds to the average A only. This represents the case where W1 is set to a value less than twice the standard deviation S (for example, Sc) and the reduced correction amount C is set to a further smaller value by the achromatic color support processing. Incidentally, in this embodiment, the gradients of the hypotenuses of the trapezoid are ½ and −½. Therefore, when the upper base of the trapezoid vanishes and thereby a triangle is formed, the gradients of the hypotenuses are given priority over the reduced correction amount C and therefore the reduced correction amount C decreases. By narrowing down the pixels to be corrected in this manner, it becomes possible to prevent such an unnecessary correction that makes the user feel odd.

While the embodiments of the present invention have been described, the present invention is not limited to those embodiments. For example, the configuration of the functional block shown in FIG. 1 is a mere example, and it may differ from an actual program module configuration. In addition, the conceptual diagrams shown in FIG. 3, FIG. 4, FIG. 6, FIG. 10A, FIG. 10B, FIG. 12 to FIG. 14, and FIG. 19 to FIG. 22B are mere examples, and the same data may be represented in other forms. Moreover, the processing flows shown in FIG. 2, FIG. 5, FIG. 7 to FIG. 9, FIG. 11, and FIG. 15 to FIG. 18 are also mere examples. Therefore, the order of the processing may be exchanged within the range in which the same processing result is obtained, the processing may be executed simultaneously, or a step may be added or deleted, if necessary.

The apparatus for executing the aforementioned processing may be a general computer having a memory and a processor, a digital camera having a processor, or other image processing apparatuses.

What is claimed is:

1. An image processing method, comprising:
generating a histogram by counting a number of pixels for each predetermined color section in a color system having no singular point, for a specific image;
detecting a local peak that is a portion where the counted number of pixels is maximum in the generated histogram, and determining a local peak color value, which is a color value corresponding to said local peak; and
identifying a pixel in said specific image based on the determined local peak color value.

2. The image processing method as set forth in claim 1, wherein said color system having no singular point is a uniform color system.

3. The image processing method as set forth in claim 1, wherein said predetermined color section is defined by color components other than luminance among color components constituting said color system having no singular point.

4. The image processing method as set forth in claim 1, wherein said detecting and determining comprise: calculating a color value corresponding to said local peak by using said number of pixels in said color section of said local peak and said number of pixels in said color sections in vicinity of said color section of said local peak.

5. The image processing method as set forth in claim 1, wherein said identifying comprises: identifying pixels having an adjacent color value of said local peak color value.

6. The image processing method as set forth in claim 5, wherein said identifying comprises: determining whether or not a pixel in said specific image has said adjacent color value of said local peak color value, by using thresholds, as references, which are different each other for each predetermined color component for determination of an adjacent color.

7. The image processing method as set forth in claim 5, wherein said identifying comprises: identifying pixels having an adjacent color value that is a color value satisfying a predetermined condition in relation to said local peak color value for a color component in a color system different from said color system defining said predetermined color section.

8. The image processing method as set forth in claim 7, wherein said color component in said color system different from said color system defining said predetermined color section is at least one of a chroma component and a hue component.

9. The image processing method as set forth in claim 1, further comprising:
calculating a feature value of said pixel identified in said identifying for each said local peak; and
calculating an evaluation value corresponding to said local peak from the calculated feature value for each said local peak.

10. The image processing method as set forth in claim 9, wherein said feature value is at least one of a value concerning color values of said pixels identified in said identifying, and a value concerning variation of said color values of said pixels identified in said identifying.

11. The image processing method as set forth in claim 1, further comprising:
extracting an area containing said pixels identified in said identifying;
calculating a feature value of said pixels contained in the extracted area for each said extracted area; and
calculating an evaluation value corresponding to said area for each said area from the calculated feature value.

12. The image processing method as set forth in claim 11, wherein said feature value is at least one of a value concerning said color values of said pixels contained in said area, a value concerning variation of said color values of said pixels contained in said area, a position of said area in said specific image, and a size of said area in said specific image.

13. The image processing method as set forth in claim 11, wherein said extracting comprises: extracting an area based on positional continuity of pixels.

14. The image processing method as set forth in claim 1, further comprising:
calculating a correction reference color value from said pixels identified in said identifying.

15. The image processing method as set forth in claim 5, further comprising:
calculating a correction reference color value from said pixels identified in said identifying.

16. The image processing method as set forth in claim 9, further comprising:
identifying pixels corresponding to said local peak to be a reference based on the calculated evaluation value; and
calculating a correction reference color value from the identified pixels.

17. The image processing method as set forth in claim 16, further comprising:
calculating a reference color correction amount based on the calculated correction reference color value and a preset color value.

18. The image processing method as set forth in claim 17, wherein a maximum value of said reference color correction amount is adjusted based on said evaluation value.

19. The image processing method as set forth in claim 17, further comprising:
correcting, only by said reference color correction amount, pixels having color values contained in a color range that is set based on distribution of said color values of said pixels identified in said identifying pixels corresponding to said local peak.

20. The image processing method as set forth in claim 17, further comprising:
changing said reference color correction amount according to a difference between a color value of a specific pixel contained in said specific image and said correction reference color value.

21. The image processing method as set forth in claim 20, wherein said changing is executed for each color component of said color system different from said color system having no singular point.

22. The image processing method as set forth in claim 21, wherein a different change pattern of said reference color correction amount is set for each said color component of said color system different from said color system having no singular point.

23. The image processing method as set forth in claim 22, wherein said color components of said color system different from said color system having no singular point are a chroma component and a hue component.

24. The image processing method as set forth in claim 20, further comprising:
setting said change pattern of said reference color correction amount in said changing, based on a predetermined color value.

25. The image processing method as set forth in claim 24, wherein said predetermined color value is of an achromatic color and said change pattern of said reference color correction amount is set so as to reduce said correction amount of said achromatic color value.

26. An image processing program embodied on a computer readable medium, said image processing program comprising:
generating a histogram by counting a number of pixels for each predetermined color section in a color system having no singular point, for a specific image;
detecting a local peak that is a portion where the counted number of pixels is maximum in the generated histogram, and determining a local peak color value, which is a color value corresponding to said local peak; and
identifying a pixel in said specific image based on the determined local peak color value.

27. An image processing apparatus, comprising:
a unit that generates a histogram by counting a number of pixels for each predetermined color section in a color system having no singular point, for a specific image;
a unit that detects a local peak that is a portion where the counted number of pixels is maximum in the generated histogram, and determines a local peak color value, which is a color value corresponding to said local peak; and
a unit that identifies a pixel in said specific image based on the determined local peak color value.

* * * * *